(12) United States Patent
Ageneau et al.

(10) Patent No.: US 8,042,828 B2
(45) Date of Patent: Oct. 25, 2011

(54) MULTI-POSITION FOLDABLE STROLLER

(75) Inventors: Laurent Ageneau, Saint Laurent sur Sevre (FR); Bruno Zweideck, Cholet (FR)

(73) Assignee: Cosco Management, Inc., Wilmington, DE (US)

( * ) Notice: Subject to any disclaimer, the term of this patent is extended or adjusted under 35 U.S.C. 154(b) by 166 days.

(21) Appl. No.: 12/472,276

(22) Filed: May 26, 2009

(65) Prior Publication Data

US 2009/0302577 A1    Dec. 10, 2009

(30) Foreign Application Priority Data

May 26, 2008    (FR) ...................................... 08 53423
Aug. 28, 2008    (FR) ...................................... 08 55779

(51) Int. Cl.
    *B62B 1/00*    (2006.01)
(52) U.S. Cl. ...................................... 280/642
(58) Field of Classification Search .................. 280/642, 280/643, 644
    See application file for complete search history.

(56) References Cited

U.S. PATENT DOCUMENTS

| | | | |
|---|---|---|---|
| 5,863,061 A * | 1/1999 | Ziegler et al. | ................. 280/642 |
| D463,329 S | 9/2002 | Yang et al. | |
| D463,332 S | 9/2002 | Wu | |
| D470,802 S | 2/2003 | You | |
| 6,626,452 B2 | 9/2003 | Yang et al. | |
| D502,896 S | 3/2005 | Pullam | |
| 7,017,922 B2 | 3/2006 | Hartenstine et al. | |
| D519,419 S | 4/2006 | Cheng et al. | |
| D519,888 S | 5/2006 | Cheng et al. | |
| D532,721 S | 11/2006 | Wu et al. | |
| 7,377,537 B2 | 5/2008 | Li | |
| D583,719 S | 12/2008 | Siewertsen | |

FOREIGN PATENT DOCUMENTS

| | | |
|---|---|---|
| CN | 101104413 | 1/2008 |
| EP | 0577496 | 1/1994 |
| EP | 1170192 | 1/2002 |
| EP | 1967440 | 9/2008 |
| FR | 2918340 | 1/2009 |
| JP | 2234876 | 9/1990 |

OTHER PUBLICATIONS

International Search Report dated Apr. 14, 2009, for French Application FR 0855779.

* cited by examiner

*Primary Examiner* — Faye M. Fleming
(74) *Attorney, Agent, or Firm* — Barnes & Thornburg LLP

(57) ABSTRACT

A foldable stroller includes a rolling chassis, a push arm coupled to the rolling chassis to move relative to the chassis, and a folding mechanism.

19 Claims, 21 Drawing Sheets

MULTI-POSITION FOLDABLE STROLLER

This application claims priority under 35 U.S.C. §119(a) to French Patent Applications No. FR 0853423, filed May 26, 2008 and No. FR 0855779, filed Aug. 28, 2008, which are expressly incorporated by reference herein.

BACKGROUND

The present disclosure relates to strollers for juveniles and in particular to foldable strollers. More particularly, the present disclosure relates to a folding mechanism included in a foldable stroller.

SUMMARY

A foldable stroller in accordance with the present disclosure includes a rolling chassis and a child carrier. The child carrier is coupled to and supported by the rolling chassis. The rolling chassis includes a collapsible left frame and a collapsible right frame coupled together. Each collapsible frame includes a front strut, a rear strut coupled to the front strut, and a push arm coupled to the front strut.

In illustrative embodiments, the foldable stroller further includes a frame mover arranged to lie between and interconnect the collapsible frames. The frame mover includes a linkage and a linkage actuator. The linkage operates to move the collapsible frames between an unfolded use position and fully collapsed storage position. In moving from the unfolded use position to the fully collapsed storage position, a handle included in the linkage actuator is pulled upwardly to cause the collapsible frames to move toward each other, the rear struts to move toward the front struts, and the push arms to retract towards the front struts.

In illustrative embodiments, the foldable stroller may also be moved to a partly collapsed storage position from the unfolded use position. In use, the push arms are pushed toward the ground to cause the rear struts to move toward the front struts and the push arm to move retract toward the front struts. In the partly collapsed storage position, the collapsible frames remain spaced-apart from one another. In illustrative embodiments, the foldable stroller may be moved from the partly collapsed storage position to the fully collapsed storage position by pulling upwardly on the handle included in the linkage actuator to cause the linkage to move the collapsible frames toward each other.

Additional features of the present disclosure will become apparent to those skilled in the art upon consideration of illustrative embodiments exemplifying the best mode of carrying out the disclosure presently perceived.

BRIEF DESCRIPTION OF THE DRAWINGS

The detailed description particularly refers to the accompanying figures in which:

FIG. 4 is a kinematic right elevation view of the foldable stroller of FIG. 1 showing the foldable stroller in the unfolded-use position;

FIG. 5 is a kinematic right elevation view of the foldable stroller of FIG. 3B showing the foldable stroller in the partly collapsed storage position and showing that a flexible link included in the linkage has deformed;

FIG. 6 is a kinematic rear elevation view of the foldable stroller of FIGS. 3B and 5 showing the foldable stroller in the partly collapsed storage position and showing that the collapsible frames remain in spaced-apart relation to each other;

FIG. 7 is a kinematic right elevation view of the foldable stroller of FIG. 3A showing the foldable stroller in the fully collapsed storage position and showing that a flexible link is un-deformed;

FIG. 8 is a kinematic rear elevation view of the foldable stroller of FIGS. 3A and 7 showing the foldable stroller in the fully collapsed storage position and showing the collapsible frames have moved toward each other;

FIG. 15 is an exploded perspective view of a locking mechanism in accordance with the present disclosure showing that the locking mechanism includes a pivoting lock configured to block pivoting of the rear strut relative to the front strut and a rear cross-brace slide lock configured to block sliding movement of the rear cross-brace;

FIG. 16 is left elevation view of the locking mechanism of FIG. 15 showing the folding mechanism in the unfolded use position;

FIG. 17 is a front elevation view of the locking mechanism of FIG. 16;

FIG. 18 is a sectional view taken about line 18-18 of FIG. 17 showing various internal components of the locking mechanism;

FIG. 19 is a left elevation view of the locking mechanism of FIG. 15 showing the folding mechanism in the partly collapsed storage position;

FIG. 20 is a front elevation view of the locking mechanism of FIG. 19;

FIG. 21 is a sectional view taken about the line 21-21 of FIG. 20 showing the various internal components of the locking mechanism when in the partly collapsed storage position;

FIG. 22 is a left elevation view of the locking mechanism of FIG. 15 showing the folding mechanism in the fully collapsed storage position;

FIG. 23 is a front elevation view of the locking mechanism of FIG. 22;

FIG. 24 is a sectional view taken about line 24-24 of FIG. 23 showing the various internal components of the locking mechanism when in the fully collapsed storage position;

FIG. 25 is a sectional view taken about line 25-25 of FIG. 24;

FIG. 26 is a sectional view similar to FIG. 24 showing the folding mechanism in the fully collapsed storage position and showing that an actuator button included in the folding mechanism has been moved downwardly to free the pivot lock;

FIG. 27 is a sectional view taken about line 27-27 of FIG. 26;

FIG. 28 is a sectional view of the locking mechanism of FIG. 15 showing the locking mechanism moving from a folded position toward the unfolded use position and showing that the actuator button is still actuated inwardly and held in place by a portion of a hinge assembly included in the locking mechanism;

FIG. 29 is a sectional view similar to FIG. 29 showing the locking mechanism after the move from the folded position the unfolded use position has been completed;

DETAILED DESCRIPTION

Figure 1:
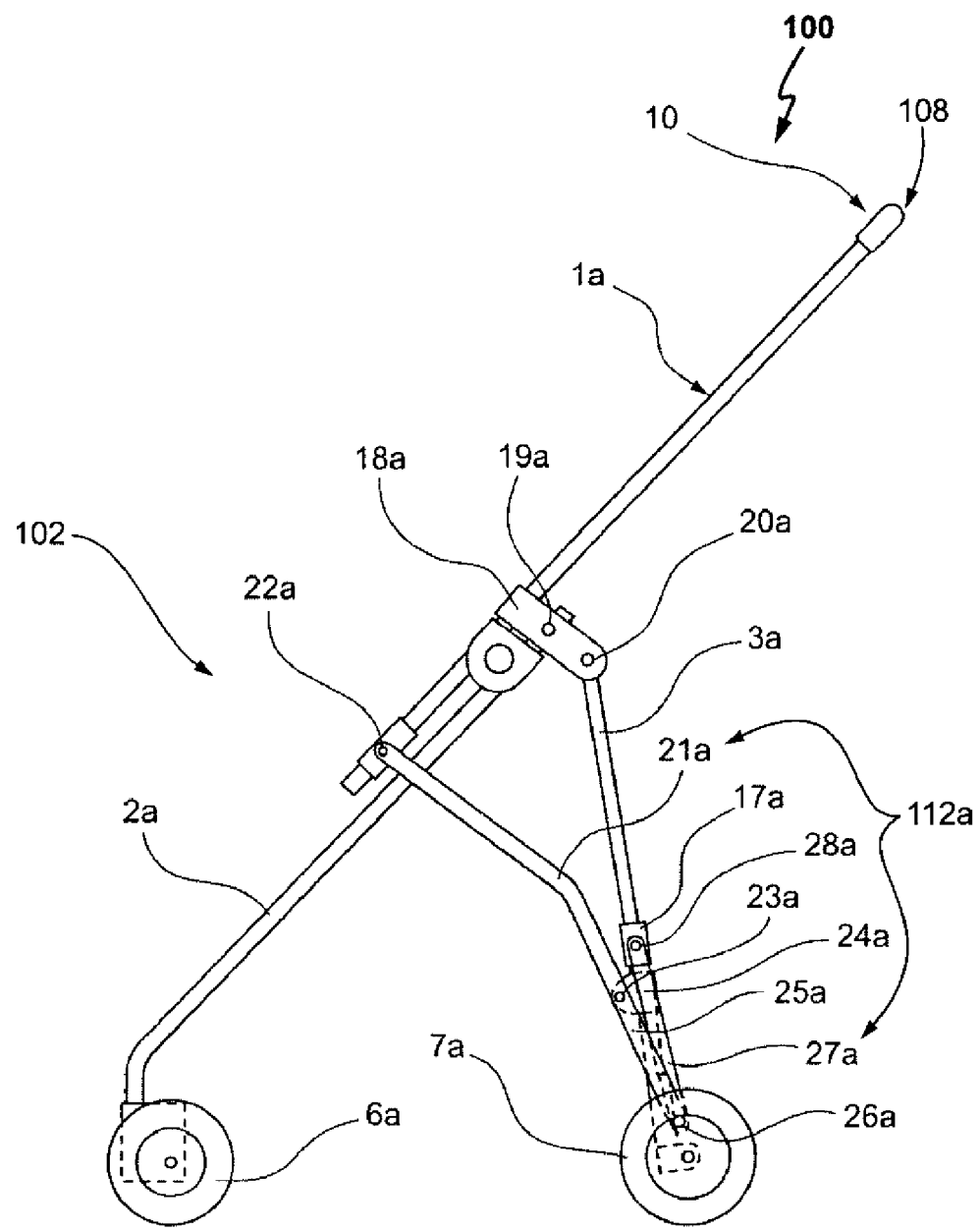
FIG. 1 is left elevation view of a foldable stroller in accordance with the present disclosure showing the foldable stroller in an unfolded-use position and that the foldable stroller includes a frame mover in accordance with a first embodiment of the present disclosure.
Figure 2:
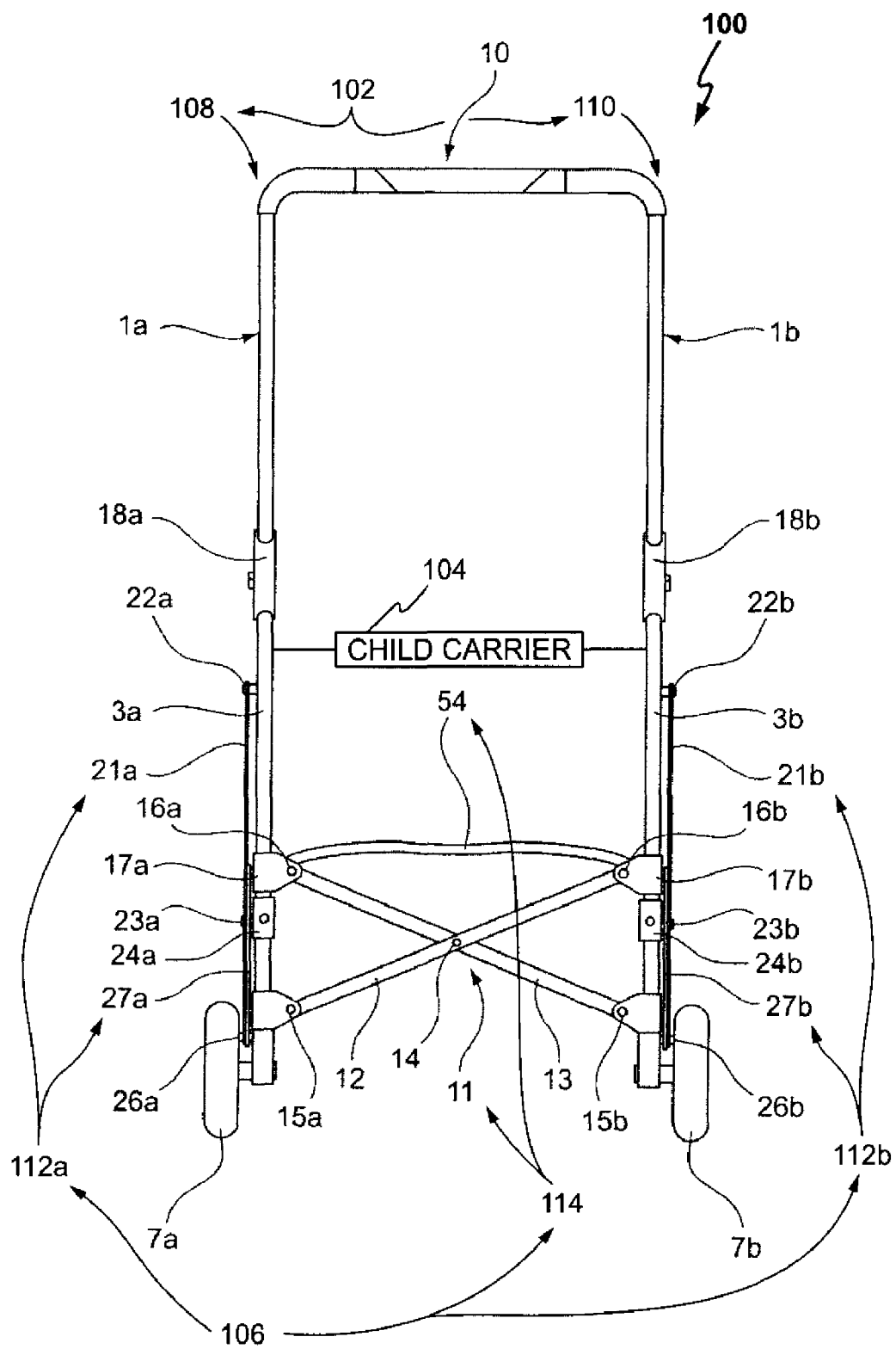
FIG. 2 is rear elevation view of the foldable stroller of FIG. 1 showing that the frame mover of the foldable stroller includes an X-shaped linkage actuator extending between the left rear strut and the right rear strut.
Figure 3A:
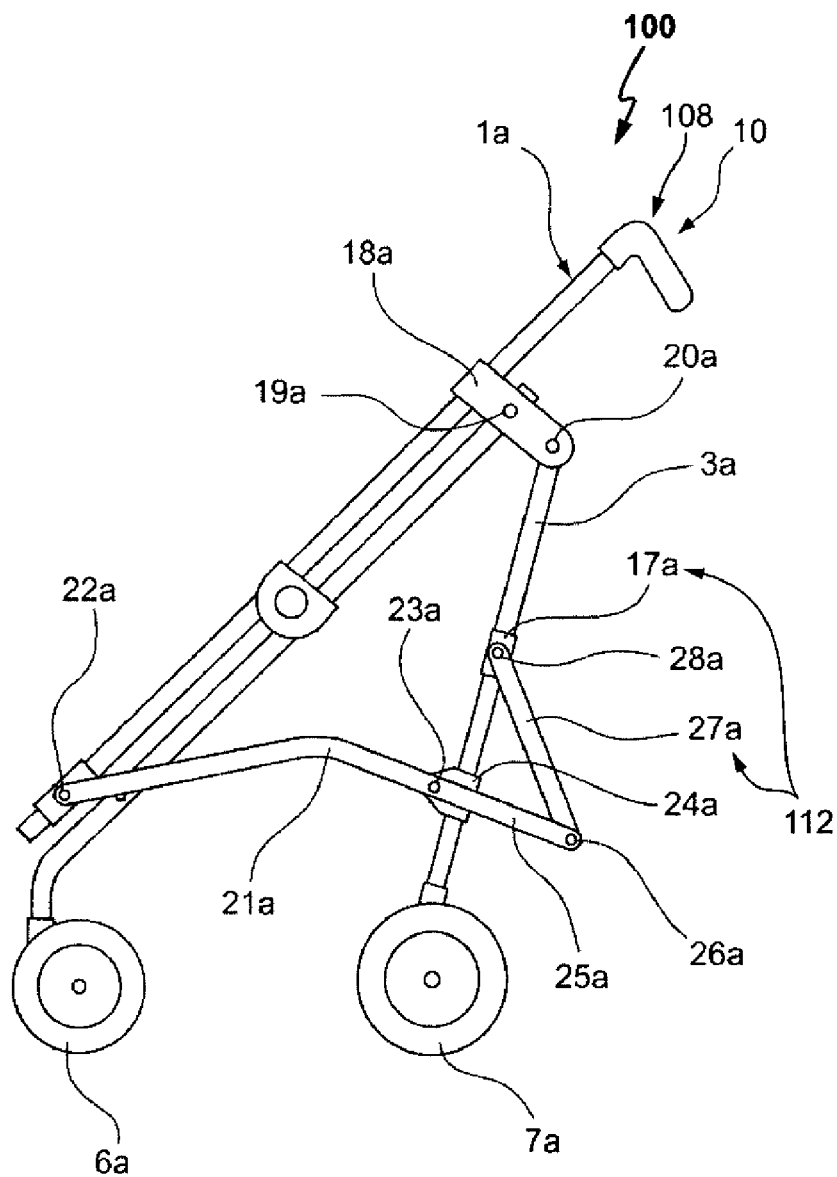
FIG. 3A is left side elevation view of the foldable stroller of FIG. 2 showing the foldable stroller in a fully collapsed storage position wherein the push arm has moved into parallel confronting relation with the front strut and the rear strut has pivoted toward the front strut, and suggesting that the rear struts have moved toward each other as suggested in FIG. 8.
Figure 3B:
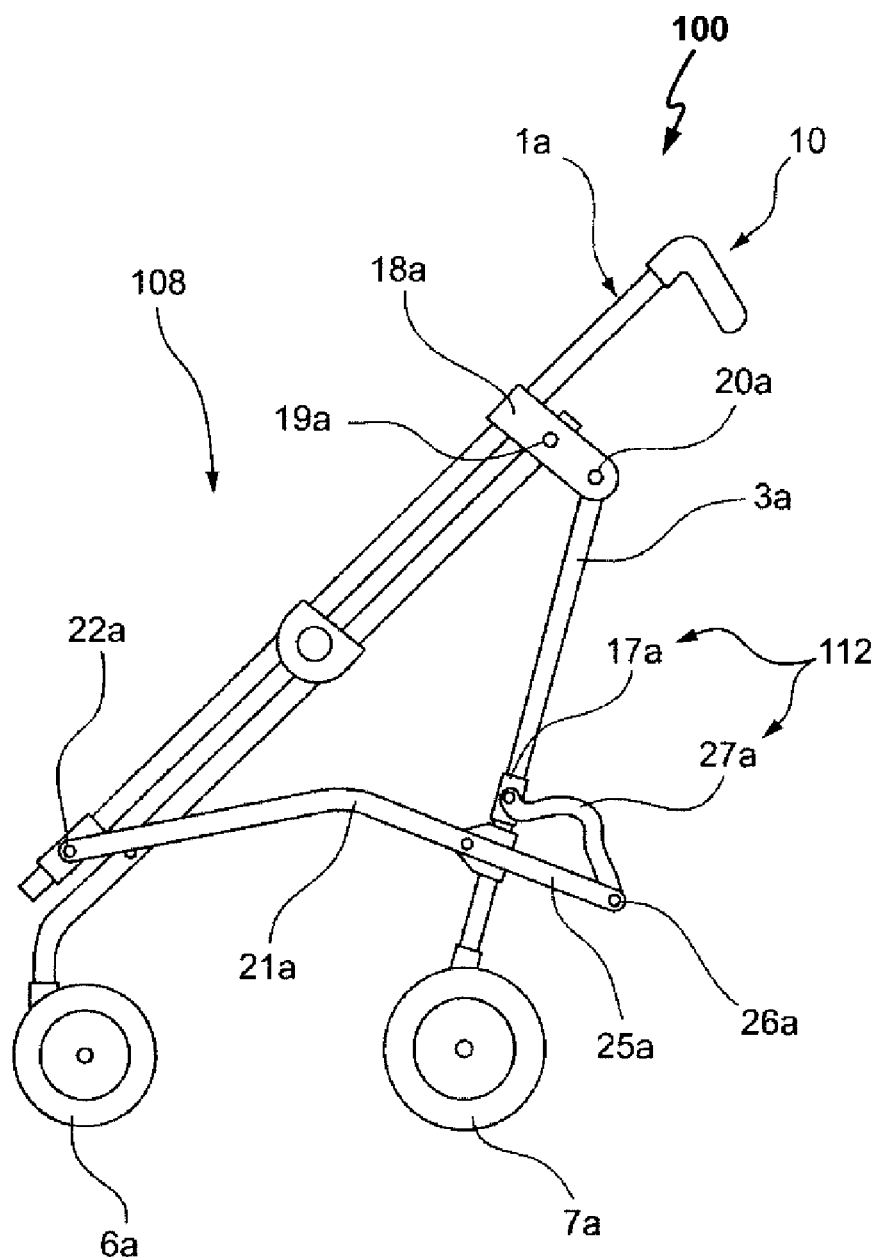
FIG. 3B is left side elevation view of the foldable stroller of FIG. 3 showing the foldable stroller in partly collapsed storage position wherein the push arm has moved into parallel confronting relation with the front strut and the rear strut has pivoted toward the front strut, but the rears struts remain in spaced-apart relation to each other and showing that the partly collapsed storage position is established after a flexible link included in a linkage of the frame mover has deformed.
Figure 4:
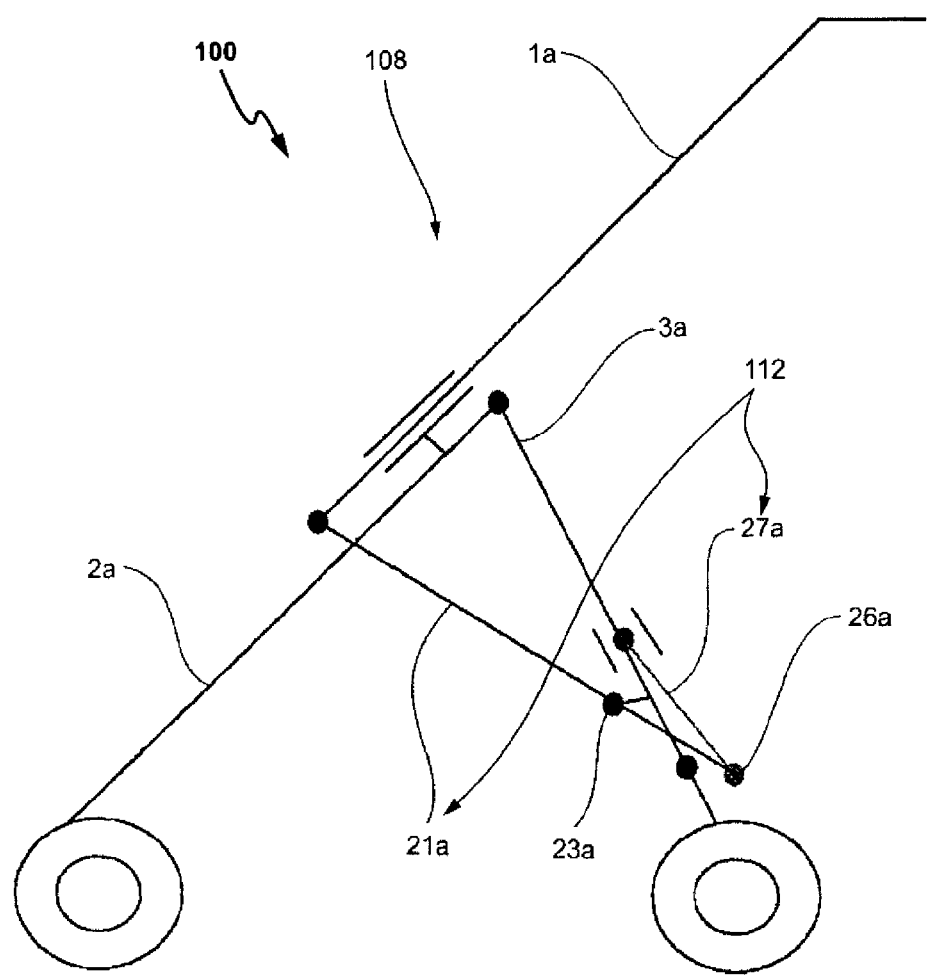
FIG. 4-8 show a series of kinematic representations of the foldable stroller of FIG. 1 to illustrate how the various components of the foldable stroller move relative to each other when moving between the unfolded use position, fully collapsed storage position, and the partly collapsed storage position.
Figure 7:
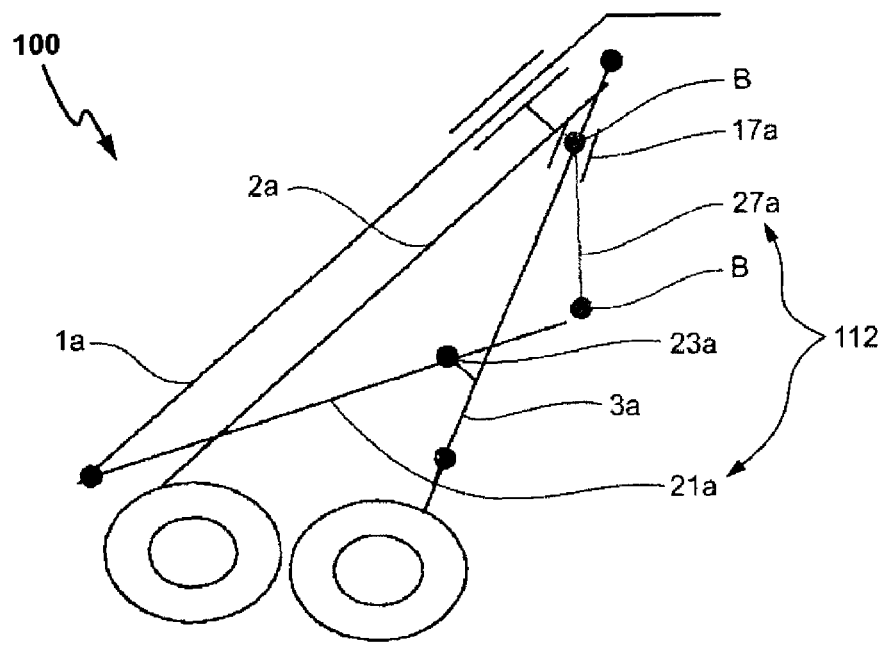
Figure 8:
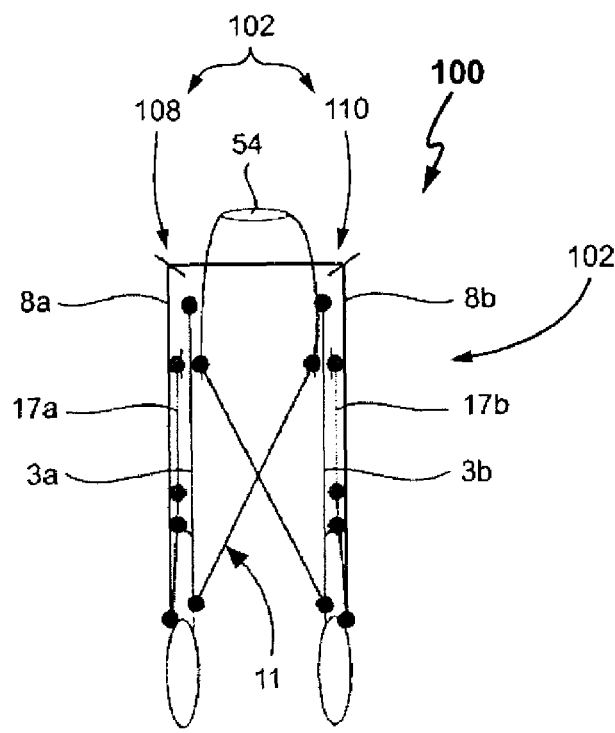
Figure 13:
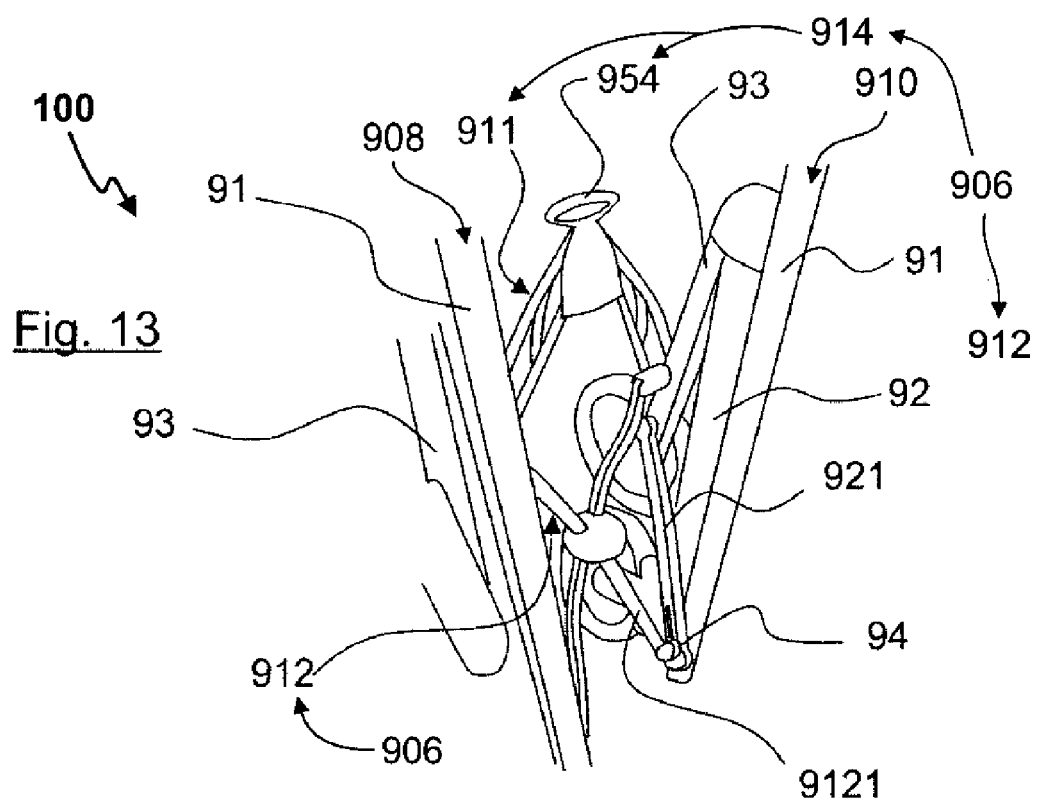
FIG. 13 is a partial perspective view of the foldable stroller of FIG. 11 showing the foldable stroller in the fully collapsed storage position.
Figure 14:
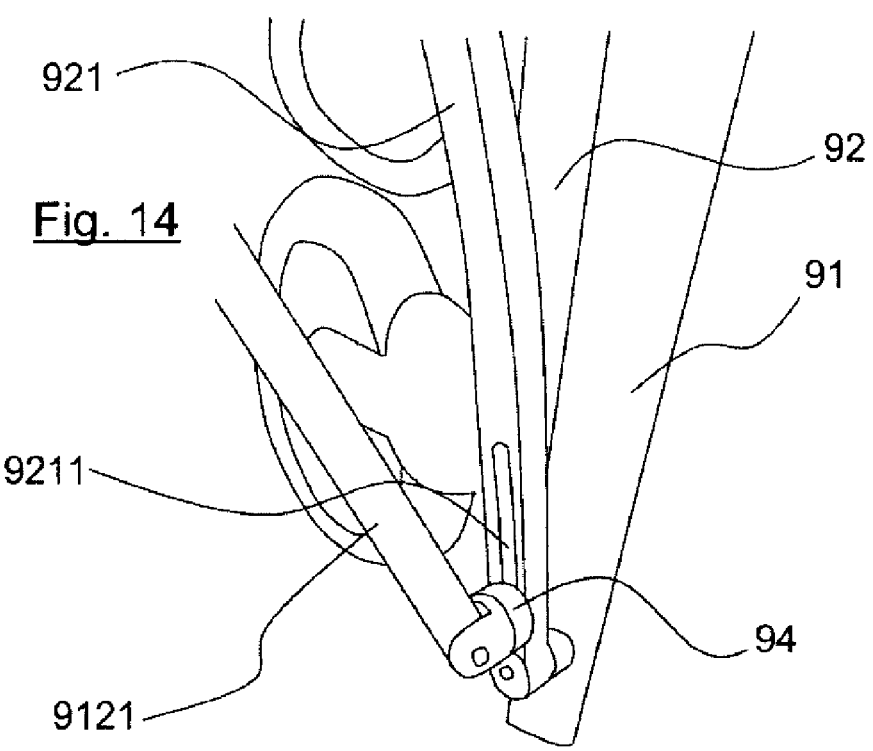
FIG. 14 is an enlarged partial perspective view similar to FIG. 12 showing the position of the base cross-brace relative to the slot in the lateral-connecting rod when the foldable stroller is in the fully collapsed storage position.

A foldable stroller 100, in accordance with the present disclosure, includes a rolling chassis 102, a child carrier 104, and a frame mover. A first embodiment of a frame mover 106 is shown, for example, in FIGS. 1-8. Frame mover 106 operates to allow foldable stroller 100 to move between an unfolded use position, as shown in FIGS. 1, 2, and 4, a fully collapsed storage position, as shown in FIGS. 3A, 7, and 8, and a partly collapsed storage position, as shown, for example, in FIGS. 3B, 5, and 6. A second embodiment of a frame mover 906 is shown, for example, in FIGS. 9-14. Frame move 906 operates to allow foldable stroller 100 to move between an unfolded use position (FIGS. 9 and 10), a partly collapsed storage position (FIGS. 11 and 12), and a fully collapsed storage position (FIGS. 13 and 14).

Illustratively, frame mover 106 includes a linkage 112 and a linkage actuator 114 as suggested in FIGS. 2 and 3A. Linkage actuator 114 operates to move a collapsible left frame 108 and a collapsible right frame 110 of rolling chassis 102 together in response to a user (not shown) pulling upwardly on a handle rod 54 included in linkage actuator as suggested in FIG. 8 to establish the fully collapsed storage position. Alternatively, the partly collapsed storage position is established by the user pushing downwardly push arms 1a, 1b of collapsible frames 108, 110 to cause the rear struts 3a, 3b to pivot toward the front struts as suggested in FIG. 5.

Figure 9:
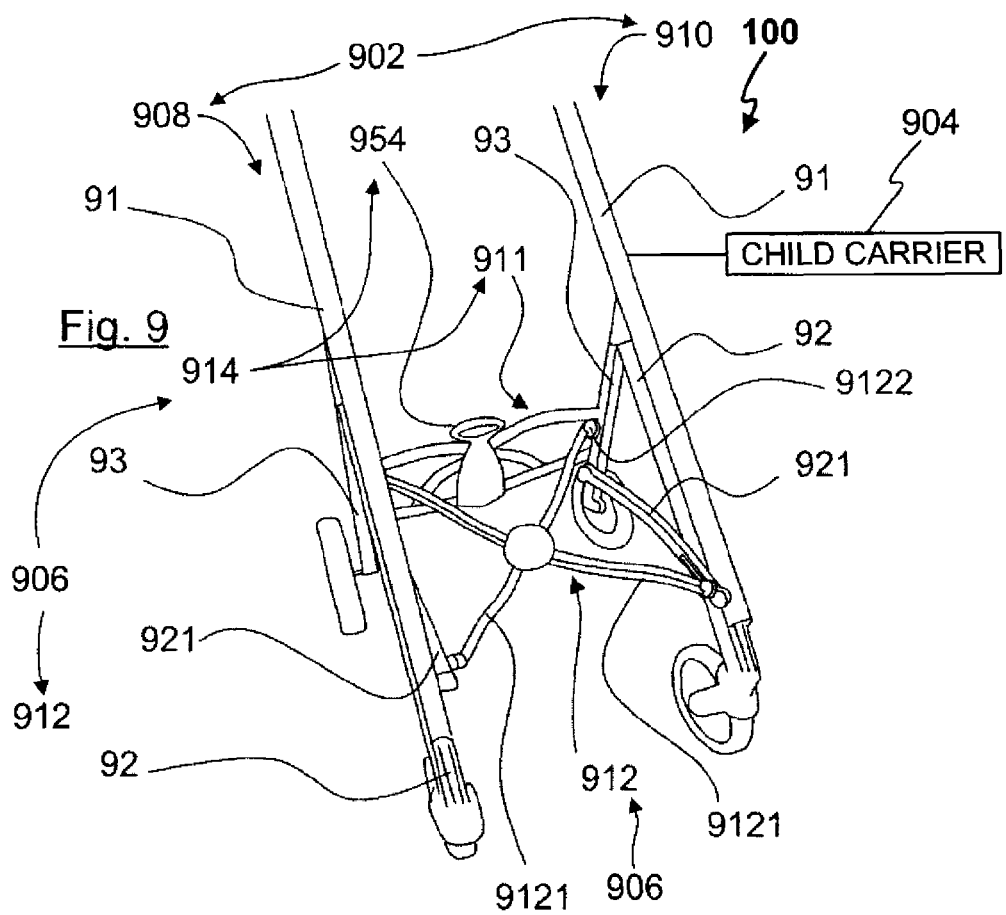
FIG. 9 is a partial perspective view of a foldable stroller in accordance with the present disclosure showing the foldable stroller in an unfolded use position and showing that the foldable stroller includes a frame mover in accordance with another embodiment of the present disclosure.
Figure 11:
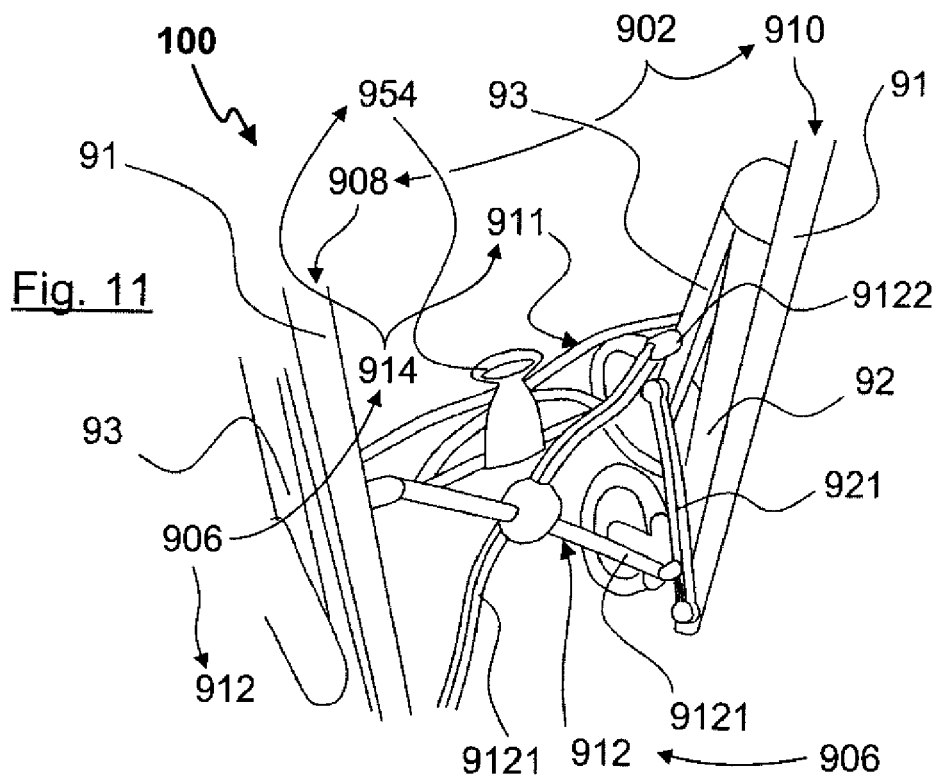
FIG. 11 is a partial perspective view of the foldable stroller of FIG. 9 showing that the foldable stroller is in the partly collapsed storage position.

A foldable stroller 900 in accordance with the present disclosure includes a rolling chassis 902, a child carrier 904, and a frame mover 906 in accordance with another embodiment of the present disclosure as suggested in FIGS. 9 and 11. Frame mover 906 includes a linkage 912 and a linkage actuator 914 as shown in FIG. 9. Linkage actuator 914 interconnects rear struts 93 of rolling chassis 102 and includes a grip handle 954 used by the user to move foldable stroller 900 from the unfolded use position to the fully collapsed folded position as suggested in FIG. 13. Foldable stroller 900 may be moved from the unfolded use position to the partly folded storage position by the user pushing on push arms 91 toward the ground as was done with the first embodiment of foldable stroller 100. Foldable stroller 900 is retained in its position by a folding lock mechanism 916 included in foldable stroller 900.

The first embodiment of foldable stroller 100, as shown in FIGS. 1-8, includes rolling chassis 102, child carrier 104 adapted to support a child (not shown) sitting in foldable stroller 100, and frame mover 106. Foldable stroller 100 is configured to move between an unfolded use position, as shown in FIG. 1, a partly collapsed storage position as shown in FIG. 3B, and a fully collapsed storage position as shown in FIG. 3A.

Rolling chassis 102 includes collapsible left frame 108 and collapsible right frame 110. Illustratively, collapsible left frame 108 includes left front strut 2a, left rear strut 3a, and left push arm 1a. Left rear strut 3a, 93 is coupled to left front strut 2a to pivot about a left pivot axis during movement between the unfolded use position, the partly collapsed storage position, and the fully collapsed storage position. The left push arm 1a is coupled to the left front strut 2a to slide back and forth between an unfolded use position where the left push arm 1a extends upwardly away from left front strut 2a and a retracted storage position where left push arm 1a is moved downwardly toward left front strut 2a. Similarly, collapsible right frame 110 has components similar to collapsible right frame 108.

Frame mover 106, as shown in FIGS. 1 and 2, includes linkage 112 and a linkage actuator 114. Linkage 112 operates to move collapsible frames 108, 110 toward each other to establish the fully collapsed storage position. In moving from the unfolded use position to the fully collapsed storage position, a handle rod 54 included in linkage actuator 114 is pulled upwardly to cause collapsible frames 108, 110 to move toward each other, the rear struts 3a, 3b to move toward the front struts 2a,2b, and the push arms 1a, 1b to retract towards the front struts 2a, 2b.

As shown in FIG. 2, linkage actuator 114 includes a rear cross-brace 11 and handle rod 54. Rear cross-brace 11 extends between left rear strut 3a and right rear strut 3b. Linkage 112 includes a left lateral connecting rod 21a, a right lateral connecting rod 21b, a left flexible connector 27a, and a right flexible connector 27b. Illustratively, left lateral connecting rod 21a is coupled on one end to a lower end of left push arm 1a and coupled on an opposite end to left flexible connection 27a. Left flexible connection 27a operates to interconnect the left lateral connection rod 21a to rear cross-brace 11. Right connecting rod 21b and right flexible connection 27b are configured in a similar manner as their left-side counterparts.

According to the present disclosure, a rolling chassis 102 includes means 112 for selective coupling of means 106 for controlling the spacing between the collapsible frames 108, 110, also called lateral assemblies, capable of adopting an active state and an inactive state, so as to enable two types of folding of rolling chassis 102. The first folding is a fully collapsed storage position, in which lateral assemblies 108, 110 are simultaneously folded and brought together by spacing control means 106, in the active state. The second folding is a partly collapsed storage position, in which the lateral assemblies 108,110 are folded and kept apart from one another, and the spacing control means 106 are detached from the lateral assemblies, in the inactive state. It is thus possible to obtain two distinct folding positions for the same stroller 100, one in partly collapsed storage position and one in fully collapsed storage position.

The selective coupling means 112 can be likened to a one-way coupling or engagement and assumes no action by the user in order to switch to an active position or engaged configuration in which it transmits a movement or in an inactive position or disengaged configuration in which it does not transmit a movement. Illustratively, the selective coupling means 112 is in the active state when the folding is performed by acting on spacing control means 106, and in the inactive state when the folding is performed by acting on lateral assemblies 108, 110.

Thus, if one acts on lateral assemblies 108, 110 in order to fold them, the spacing control means 106 are disengaged, and a partly collapsed storage position of rolling chassis 102, and therefore of the stroller 100, is obtained. If one acts on the compact folding control means 106 in order to bring together the lateral assemblies 108, 110, the kinematic connection means 114 is engaged and force the folding of each lateral assembly 108, 110. Fully collapsed storage position of the rolling chassis 102, and therefore of the stroller 100, is thus obtained. The user of the stroller can thus choose to fold the stroller to assume a partly collapsed storage position or fully collapsed storage position.

According to a first embodiment of the present disclosure, the selective coupling means 112 includes a flexible connection 27a, 27b, in the active state when it is pulled (tensioned) and in the inactive state when it is compressed (not tensioned, or relaxed). The flexible connection 27a, 27b illustratively is a deformable strap, may also be a strap, a chain, a cable, and pivoting connecting rod assemblies or any other suitable alternative.

Illustratively, the spacing control means 114 includes an assembly of at least two rods 12, 13 forming at least one rear cross-brace 11 connecting the lateral assemblies 108, 110. In particular, the at least one rear cross-brace 11 can connect the rear struts 3a, 3b of the lateral assemblies 108, 110. The upper ends of the spacing control means 114 have a guide part 17a, 17b sliding over the corresponding rear strut. The flexible connection 27a, 27b links said guide part to a connecting rod connecting a front strut and a rear strut of the corresponding lateral assembly 108, 110.

According to another illustrative embodiment of the present disclosure, said selective coupling means includes at least one sliding connection of a connection part in a groove, in which said selective coupling means are in said active state when said connection part abuts against an end of said groove, and in said inactive state when said connection part can slide in said groove. In this case, in a specific implementation, said groove can be formed in an element of one of said lateral assemblies, and said connection part is mounted at the end of a rod of a cross-brace forming said spacing control means.

According to a specific embodiment of the present disclosure, the chassis further includes a mechanism for locking the folded position of the chassis, having: first means for locking one of said lateral elements in the folded position; second means for locking said spacing control means in the folded position; and unlocking means ensuring the simultaneous unlocking of said first and second locking means. Such a locking mechanism may lock the folded position of the chassis, and therefore the stroller, in both the partly and fully collapsed storage positions. The same action enables the unlocking in these two folding positions.

The present disclosure also relates to a stroller including such a rolling chassis and means for supporting and holding at least one removable child carrier, capable of belonging in particular to the group including foldable hammocks, non-foldable hammocks, and baby seats. The present disclosure may also relate to a stroller comprising of a chassis on which a non-removable foldable hammock is mounted.

As discussed previously, the present disclosure relates to foldable stroller that may be arranged to assume multiple position providing the possibility of a choice between two types of folding partly or fully collapsed storage position. The partly collapsed storage position is found when the lateral assemblies remain spaced apart from one another, but are folded, suitable, for example, when using a non-foldable hammock. The fully collapsed storage position is found when the lateral assemblies are folded and brought together, requiring a suitable foldable hammock, or prior removal of the hammock.

Depending on the case, the fully collapsed storage position can be achieved after the partly collapsed storage position is achieved, or directly, without going through the partly collapsed storage position. To enable this choice between partly and fully collapsed storage position, the kinematic connection between the lateral assemblies of the chassis of the stroller and the cross-braces linking these assemblies can be disengaged, so as to attach the folds of the lateral assemblies and the cross-braces in certain cases and detach them in other cases.

The present disclosure provides means 114 for selective coupling (or engagement/disengagement) enabling the folding of the lateral assemblies to be associated with the bringing together thereof. The coupling means 114 can therefore adopt two states, and active state in which these movements are associated, and an inactive state in which they are uncoupled, while the means for controlling 114 the bringing together of the lateral assemblies remain inactive, to enable the partly collapsed storage position.

As shown in FIGS. 1 and 2, rolling chassis 102 of such foldable stroller 100 includes two lateral assemblies referenced 108, 110, shown in FIG. 2. These two lateral assemblies 108, 110 are identical, and we will describe the elements that comprises the lateral assembly 108 shown in FIG. 1, which will be assigned the reference index a, with the understanding that the lateral assembly 108 of rolling chassis 102 has the same elements, which will be assigned the reference index b.

In reference to FIG. 1, the lateral assembly 108 comprises a front strut 2a and a rear strut 3a and a push arm 1a. The front strut 2a has, at its lower end, a front wheel 6a. The rear strut 3a has, at its lower end, a rear wheel 7a. The push arms 1a, 1b can be equipped with independent handles, or a transverse foldable handlebar 10 that, as shown in FIG. 2, joins the two push arms 1a and 1b. The rolling chassis 102 shown in these figures is designed to hold, for example, a child carrier 104 for transporting a child.

As shown in FIG. 2, a rear cross-brace 11 in the form of a pivoting X, joins the rear struts 3a and 3b of the stroller 100. This rear cross-brace 11 comprises a branch 12 and a branch 13 pivotably connected at their middles by a pin 14 so as to form an X. The lower ends of the branches 12 and 13 can pivot about pins 15a, 15b attached to the rear struts 3a, 3b, in the vicinity of the lower end of the rear struts 3a, 3b. The upper ends of the branches 12, 13 are pivotably connected to pins 16a, 16b secured to sleeves 17a, 17b, which are slidingly mounted on the respective rear struts 3a, 3b.

The rear X-shaped rear cross-brace 11 can be replaced by any other type of suitable cross-brace, for example including a deformable parallelogram assembly, enabling the two lateral assemblies 108, 110 to be connected while holding them apart from one another when the stroller is in an unfolded use position, and bringing them together in the fully collapsed storage position of the stroller.

The first embodiment of the present disclosure is implemented in stroller 100 by a flexible connection 27a, 27b, or connecting rod, replacing the rigid connecting rods conventionally used to obtain the fully collapsed storage position, so as not to impose the movement of the rear cross-brace 11 enabling the two sides of the stroller 100 to be brought together. Thus, these flexible connections are disengaged, i.e. inactive, or not tensioned, in a partly collapsed storage position, and engaged, i.e. active, or tensioned, in a fully collapsed storage position.

In reference again to FIG. 1, it shows that the lateral assembly 108 comprises a part forming a slide 18a secured by the pin 19a of the upper end of the front strut 2a. The slide 18a also comprises a hinge pin 20a around which the rear strut 3a can pivot. The slide 18a also has a passage through which the push arm 1a can slide, parallel to the front strut 2a. In the completely unfolded position of the stroller, shown in FIG. 1, the lower end of the push arm 1a projects downward with respect to the slide 18a.

A lateral connecting rod 21a is pivotably connected at its upper end to the pin 22a secured to the lower end of the push arm 1a. In the vicinity of its lower end, the lateral connecting rod 21a is pivotably connected to the pin 23a secured to the lower portion of the rear strut 3a. It is noted that the pin 23a is mounted, in the example shown, on a sleeve 24a stationary with respect to the rear strut 3a.

The lateral connecting rod 21a continues beyond its hinge pin 23a by an extension 25a provided at its lower end with a hinge pin 26a to which a first end of a flexible connection 27a is connected. The second end (upper end) of this flexible connection is secured by a pin 28a to the sliding sleeve 17a, which is secured to the upper end of the branch 13 of the rear cross-brace 11. This flexible connection 27a may be a strip of plastic material or in other illustrative embodiments a chain, a metal cable, an assembly of two rigid connecting rods pivotably connected to one another, or more generally any other suitable connection capable of transmitting a pulling movement when it is tensioned, but not capable of transmitting a compression movement.

The same arrangement is also in the right lateral assembly 110, in which the corresponding flexible connection 27b is secured to the sliding sleeve 17b secured to the upper end of the branch 12 of the rear cross-brace 11. The first embodiment of the present disclosure enables two folding modes to be proposed, depending on whether the flexible connections are active (tensioned) or not: a partly collapsed storage position, as shown in FIG. 3B, which shows the foldable stroller 100 during folding: the flexible connections 27a and 27b are inactive, relaxed, and the sliding sleeves 17a and 17b, and consequently the rear cross-brace 11, are immobile; a fully collapsed storage position, as shown in FIG. 3A, which shows the stroller 100 during folding: the flexible connections 27a and 27b are tensioned, and therefore active, driving the sliding sleeves 17a and 17b, and consequently the rear cross-brace 11 so as to bring the two lateral assemblies 108, 110 of stroller 100 together.

The rolling chassis 102 of the stroller described above, from the side as shown diagrammatically in FIG. 4. When the stroller 100 is in the unfolded use position, the flexible connection 27a is tensioned. When the user desires to implement a partly collapsed storage position, as shown diagrammatically in FIGS. 5 and 6, respectively from the side and from the rear, the user pushes on the push arms 1a and 1b, after having actuated the unlocking means provided for this purpose (not shown). The push arms 1a and 1b are therefore brought in parallel along the front struts 2a and 2b, by sliding.

The downward movement of the push arms 1a and 1b drives the corresponding lateral connecting rods 21a and 21b, which act on the rear struts 3a and 3b, respectively, so as to fold each of the lateral assemblies 108, 110, by bringing them over or near the corresponding front struts 2a and 2b. The rear cross-brace 11 (FIG. 6) does not move, and the spacing between the two rear struts 3a, 3b (and therefore between the two lateral assemblies 108, 110) remains unchanged, with respect to the unfolded use position (FIG. 4). The flexible connections 27a, 27b, by relaxing, enable the variation in length between points A and B corresponding respectively to the sliding sleeve 17 and, the end of the lateral connecting rod 21, to be absorbed.

Figure 5:
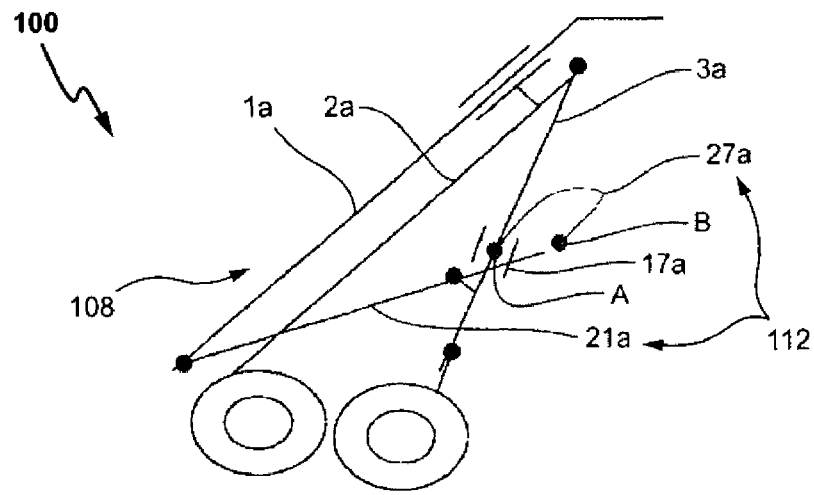
Figure 6:
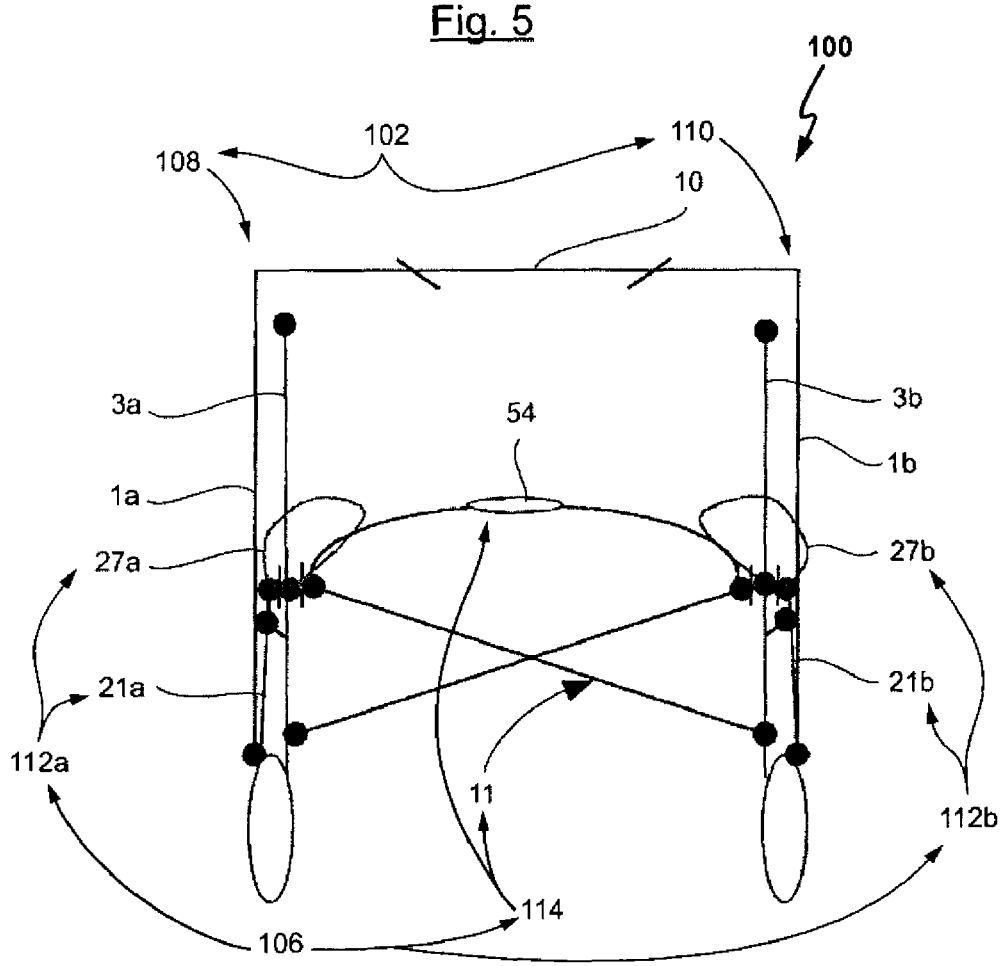

These flexible connections 27a and 27b are therefore relaxed, in this position, as shown in FIGS. 5 and 6. A partly collapsed storage position is thus obtained. This folding mode is very suitable in particular if rolling chassis 102 is folded with a non-foldable tensioned, or if maximum compactness is not required. On the other hand, when maximum compactness is desired, for example for storage in a closet or in a vehicle trunk, it is easy to complete the folding, by an additional operation, in order to obtain a fully collapsed storage position, as shown in FIGS. 7 and 8.

To do this, the user grips the handle rod 54 that connects the two sliding sleeves 17a and 17b (FIGS. 6 and 8). By acting on handle rod 54, which can, for example, be a plastic strap, but may be any other suitable alternative, the sliding sleeves 17a and 17b are guided along the respective rear struts 3a and 3b, thereby driving the folding of the rear cross-brace 11, and therefore the bringing together of the two lateral assemblies 108, 110 of stroller 100. In this position, the flexible connection 27a, 27b is again tensioned.

It is also possible to obtain a fully collapsed storage position after having actuated the unlocking means, from the unfolded position of FIG. 4. To do this, a pulling force on the handle rod 54 causes a folding of the rear cross-brace 11, bringing together the lateral assemblies, and exerts a pulling force on the flexible connections 27a and 27b, which are then tensioned. The lateral connecting rod 21, driven by the flexible connection 27a, simultaneously ensures the folding of the rear struts 3a, 3b with respect to the front struts 2a, 2b of each lateral assembly 108, 110.

The unfolding is achieved by pulling on the push arms 1a and 1b, as the case may be, after having actuated the unlocking means provided for this purpose. If the stroller is folded in the partly collapsed storage position, the flexible connections 27a, 27b are relaxed. When the lateral assemblies 108, 110 are unfolded, they are tensioned progressively, until they are tensioned in the unfolded use position of the stroller 100, as shown in FIGS. 1 and 2.

If the stroller is folded in fully collapsed storage position, the upward sliding of the push arms 1a, 1b drives the movement of the lateral connecting rods 21a, 21b, which ensure the spacing of the rear struts 3a, 3b with respect to the front struts 2a, 2b. In addition, this lateral connecting rod 21a, 21b keeps the flexible connections 27a, 27b tensioned, so that they then drive the slides 17a, 17b, so that the rear cross-brace 11 adopts its open position, and moves the two lateral assemblies 108, 110 of the stroller 100 away from one another. Means for assisting the unfolding, such as a pedal mounted on the cross-brace, may be provided.

Frame mover means is disclosed herein for allowing a user to arrange foldable stroller 100 in one of the fully collapsed storage position or the partly collapsed storage position. A first embodiment of frame mover means 106 includes a flexible connection 27 which allows the user to achieve the desired folded position. A second embodiment of frame mover means 906 includes the use of a kinematic connection to cause the bringing together of the lateral assemblies 908, 910 causes the folding of said lateral assemblies 908, 910, but the folding of the lateral assemblies 908, 910 does not necessarily cause the bringing together of the lateral assemblies 908, 910, can be implemented on most strollers capable of moving to the fully collapsed storage position.

A second embodiment of a foldable stroller 900 is shown FIGS. 9 to 14. Rolling chassis 902, as shown in FIG. 9, comprises two lateral assemblies 908, 910 each including a front strut 92, a rear strut 93 and a push arm 91. The front strut 92 and the rear strut 93 are connected by a pivoting connection at their upper end so as to form a compass arrangement. The push arm 91 is slidingly mounted on the front strut 92. A lateral connecting rod 921 is connected by pivoting connections at the lower ends of the push arm 91 and the rear strut 93, so as to kinematically link the folding of the compass formed by the front strut 92 and the rear strut 93 with the sliding of the push arm 91 on the front strut 92.

Thus, in their folded position, shown for example in FIGS. 11 and 13, the rear strut 93, the front strut 92 and the push arm 91 are brought against one another. The two lateral assemblies 908, 910 are connected to one another by compass 911 and by a base cross-brace 912. The compass 911 includes a connecting rod assembly and comprises a grip handle 954 at its middle. A pulling force on grip handle 954 enables it to be folded so as to bring the right-hand and left-hand lateral assemblies 908, 910 together. The folding of this rear cross-brace 911 is not, however, directly kinematically linked with the folding of the right-hand and left-hand lateral assemblies 908, 910.

As shown in FIG. 9, foldable chassis 902 includes a frame mover 906. Frame mover 906 includes a rear cross-brace 911 (or linkage actuator 914) extending between the left right rear struts 93, a base cross-brace 912 (or linkage 912), a left lateral connecting rod 921a, and a right lateral connecting rod 921b. Lateral connecting rod 921 interconnects front strut 92 with rear strut 93. Base cross-brace 912 interconnects rear cross-brace 911 and lateral connecting rod 921. Base cross-brace 912, rear cross-brace 911, and lateral connecting rods 921a, 921b cooperate to cause foldable chassis to move between the unfolded use position, the partly collapsed storage position, and the fully collapsed storage position as suggested in FIGS. 9-14.

Figure 10:
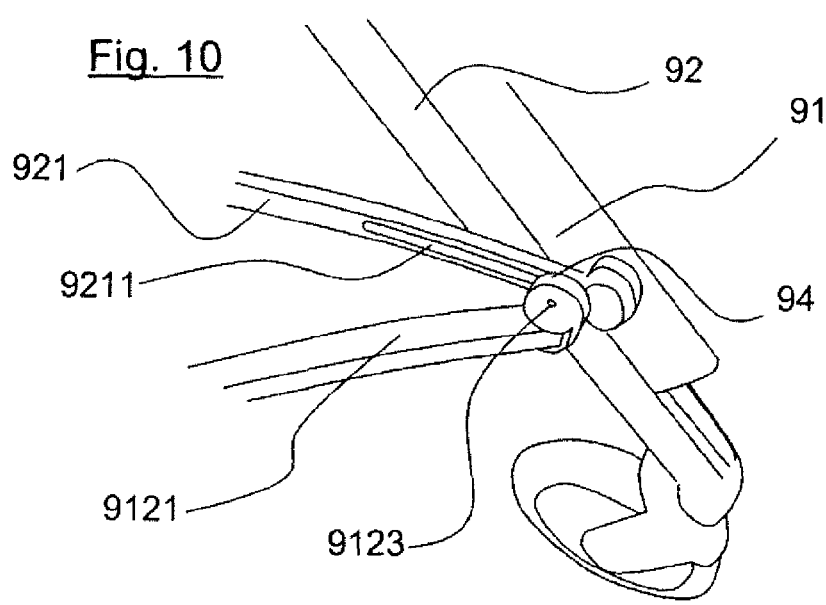
FIG. 10 is an enlarged partial perspective view of the foldable stroller of FIG. 9 showing a linkage includes a lateral-connecting rod formed to include a slot and a portion of a base cross-brace is mounted in the slot.

The base cross-brace 912 includes of two cross-members 9121 forming a hinged X, connected to the rear strut 93 of each of the lateral assembles 908, 910 by a ball joint connection 9122 and to the lateral connecting rod 921 of each of the lateral assemblies, near the push arms 91, by a sliding ball-joint connection. More specifically, as shown in FIG. 10, the front end of each of the cross-members 9121 is connected by a ball-joint connection 9123 to a connection part 94 capable of sliding along the corresponding lateral connecting rode 921. The sliding of the connection part 94 along this lateral connecting rod 921 is guided along a groove 9211 defined in the lateral connecting rod 921, in which a finger (not shown in the figures) of the connection part 94 slides.

In the unfolded use position of the stroller, shown in FIGS. 9 and 10, the connection part 94 abuts against the front end of the groove 9211, at the front of the lateral connecting rod 921. To implement the partly collapsed storage position of the stroller 100, the user unlocks the position of the push arms 91 with respect to the corresponding front struts 92, and pushes them so as to cause them to slide along the front struts 92, toward their lower end. The push arms 91, by sliding, exert a pulling force on the corresponding lateral connecting rods 921, which drive the folding of the compasses 912 formed by the front 92 and rear 93 struts. This sliding of the push arms 91 on the front struts 92 continues until the rear strut 93, the front strut 92 and the push arm 91 of each lateral assembly 908, 910 are brought against one another.

Figure 12:
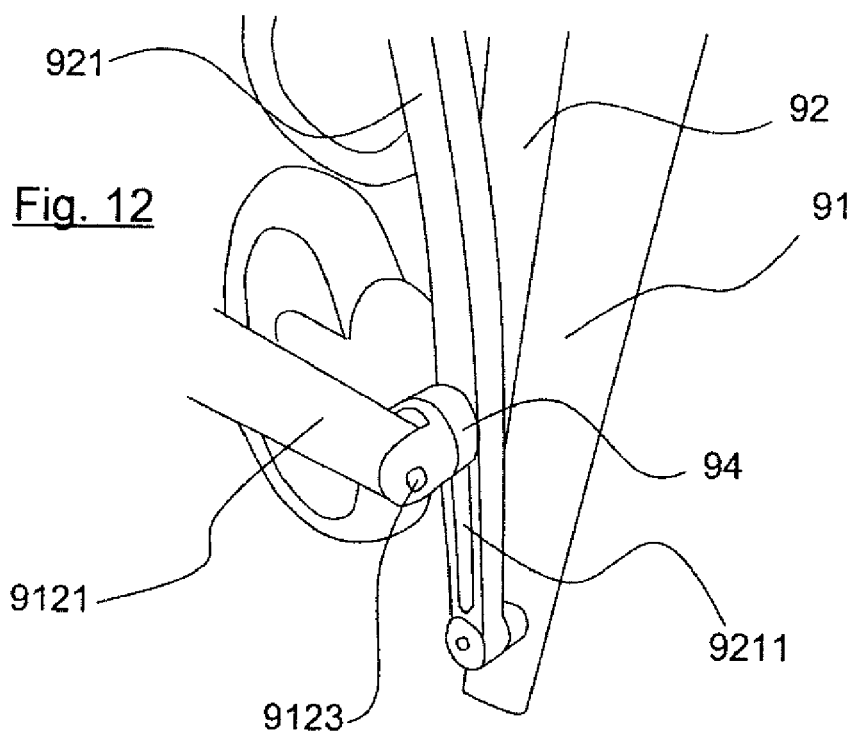
FIG. 12 is an enlarged partial perspective view similar to FIG. 10 showing the position of the base cross-brace relative to the slot in the lateral-connecting rod when the foldable stroller is in the partly collapsed storage position.

As shown in FIG. 12, when the lateral assemblies 908, 910 are folded, the connection parts 94, to which the front ends of the cross-members 9121 of the base cross-brace 912 are connected, slide along the corresponding lateral connecting rods 921 in the grooves 9211, so that the angle formed by the cross-members 9121 of the base cross-brace 912 is not modified. The folding of the lateral assemblies thus does not cause the base cross-brace 912 to fold. The distance between the two lateral assemblies thus does not vary, thereby enabling a partly collapsed storage position as shown in FIG. 11 to be obtained. From this partly collapsed storage position, a pulling force by the user on the push arms 91 causes each of the lateral assemblies to be unfolded, enabling stroller 100 to be unfolded.

The user can also act on the compass 911 of stroller 100 in the partly collapsed storage position by pulling upward on the grip handle 954 provided on compass 911. This pulling force acts on the connecting rods comprising the compass 911 so as to fold it, by bringing the lateral assembles together. The bringing together of the lateral assemblies causes the base cross-brace 912 to fold, while the connection parts 94 to which the front ends of the cross-members 9121 of the base cross-brace 912 are connected slide forward, along the corresponding lateral connecting rods 921, in the grooves 9211. Thus, the fully collapsed storage position of the stroller 100, shown in FIG. 13, is obtained, in which the connection parts 94 to which the front ends of the cross-members 9121 of the base cross-base 912 are connected have, as shown in FIG. 14, the same position with respect to the corresponding lateral connecting rods 921 as in the unfolded position of stroller 100 shown in FIGS. 9 and 10.

From the unfolded position of the stroller 100 shown in FIG. 9, it is also possible to fold stroller 100 directly into the fully collapsed storage position, by acting directly on the grip handle 954 so as to fold the compass 911 after having actuated the unlocking means. The folding of this compass 911 brings the lateral assemblies 908, 910 together, thereby causing a folding of the base cross-brace 912. As shown in FIG. 10, the connection part 94, in the unfolded position of stroller 100, abuts against the front end of the groove 9211, at the front of the lateral connecting rod 921. It cannot therefore slide forward along the lateral connecting rod 921 while the compass 911 is folding. This folding therefore causes the push arm 91 to slide along the front strut 92, until the fully collapsed storage position of stroller 100 is reached, shown in FIGS. 13 and 14.

From the fully collapsed storage position, an unfolding action on the lateral assemblies 908, 910, by a pulling force by the user on the push arms 91, drives an action on the connection parts 94 that abut at the front of the groove 9211. This action has the effect of unfolding the base cross-brace 912, thereby separating the lateral assemblies 908, 910 from one another and unfolding the stroller to establish the unfolded use position.

Figure 15:
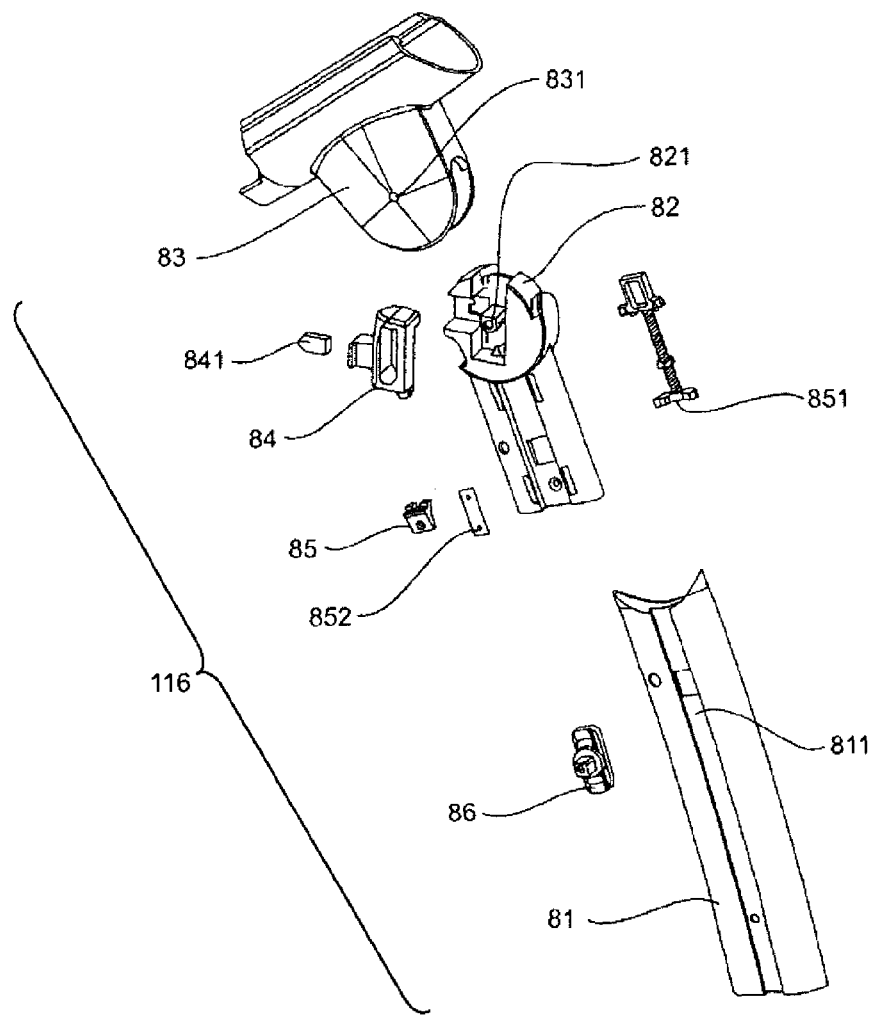
FIGS. 15-29 show a series of views illustrating a locking mechanism for use with a second embodiment of the folding mechanism illustrated, for example, in FIGS. 9-14.

As noted previously, means 116 for locking foldable stroller 100 in one of the unfolded use position, the fully collapsed storage position, or the partly collapsed storage position is included with the second embodiment of frame mover 906 in foldable stroller 100. Illustratively, locking means 116, as shown in FIG. 15, includes an upper end of a rear strut 81, a rear strut hinge element, also called a lower element 82, intended to be secured to the upper end of the rear strut 81, a front strut hinge element, also called an upper element 83, intended to be secured to the front strut and to enable the push arm to slide. The lower element 82 is designed to pivot in the upper element 83, around an axis passing through the openings 821 of the lower element and 831 of the upper element.

The lower element 82 bears the locking mechanism, which include a lock button 84, a memory unit 841, a lock stop 85, an unlocking unit 851 and a spring leaf. The rear strut 81 is formed to include a groove 811 extending over its entire length, and in which a mobile yoke 86 can slide. This mobile yoke 86 is intended to be connected to the end of a connecting rod of a rear cross-brace of the stroller (not shown). According to the position of this rear cross-brace, the mobile yoke 86 has a different position in the groove 811.

Figures 16, 17:
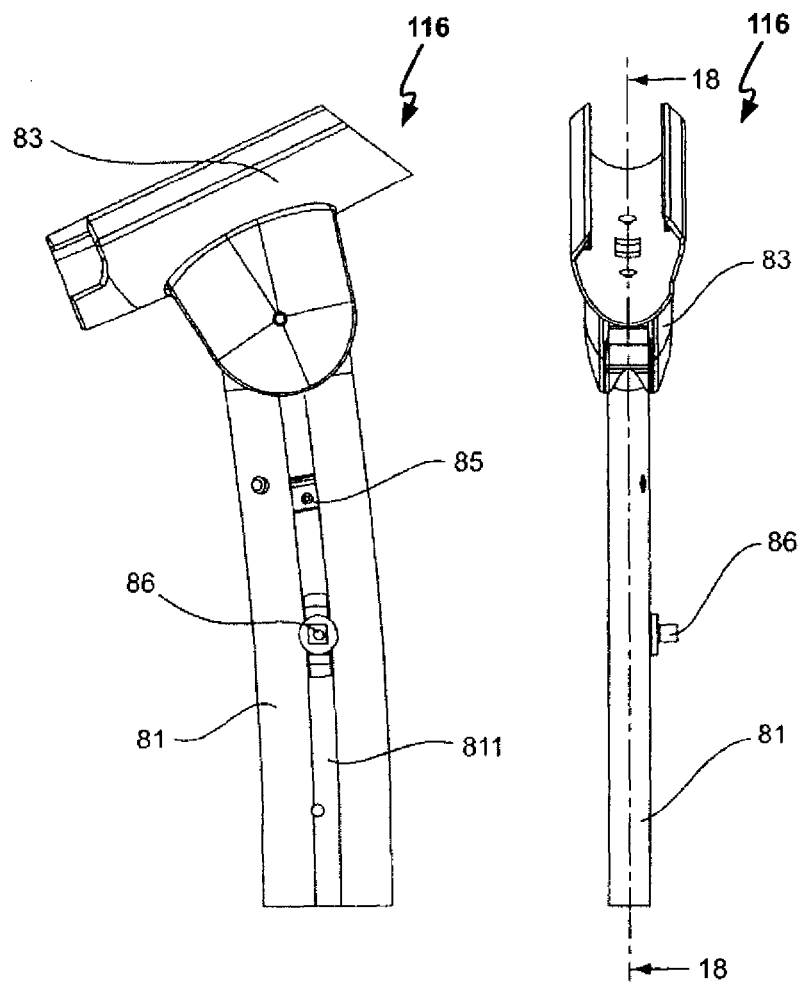
Figure 18:
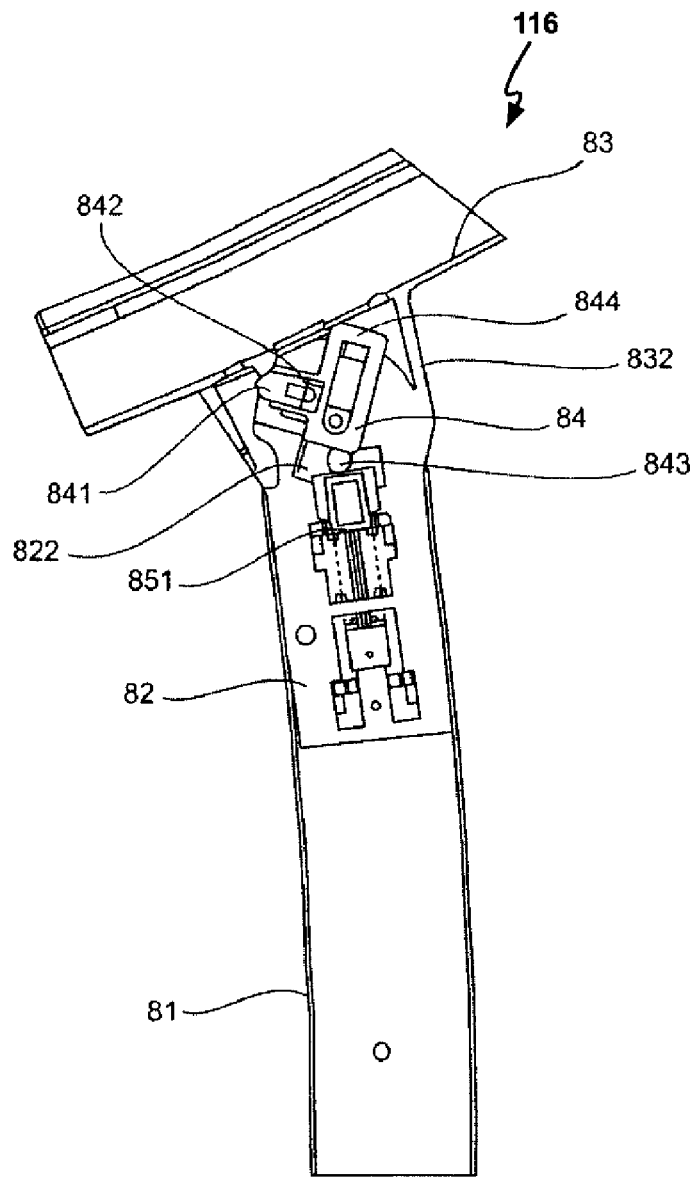

FIG. 16-18 are views of the locking mechanism 116 with the stroller 100 in the unfolded use position, respectively from the side, from the front and in a cross-section. In this unfolded use position, locking mechanism 116 does not have a locking function. It can be seen in FIG. 18 that lock button 84 can slide into an opening 822 formed in lower element 82. A spring 852 tends to hold it in its partially protruding position shown in FIG. 18. The memory unit 841 can slide into an opening 842 formed in the lock button 84, perpendicularly to the direction of sliding of the lock button 84.

In the unfolded use position of stroller 100, the user does not have access to the upper portion 844 of the lock button 84, which is hidden behind a wall 832 of the upper element 83. It can be seen in FIGS. 16 and 17 that, in this unfolded use position of the stroller 100, mobile yoke 86 is in a bottom position in groove 811, relatively spaced-apart from the upper end of the rear strut 81. This position of the mobile yoke 86 corresponds to an unfolded use position of the rear cross-brace, in which it holds the lateral elements of the stroller 100 spaced apart from one another.

Figures 19, 20:
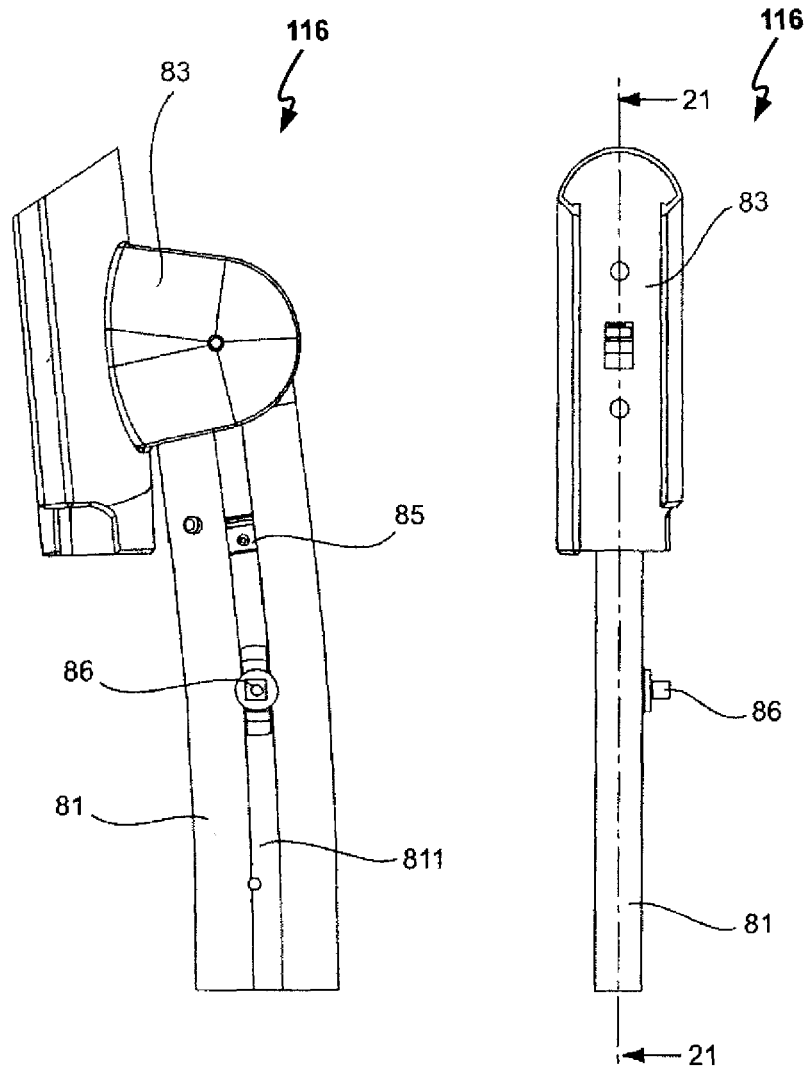
Figure 21:
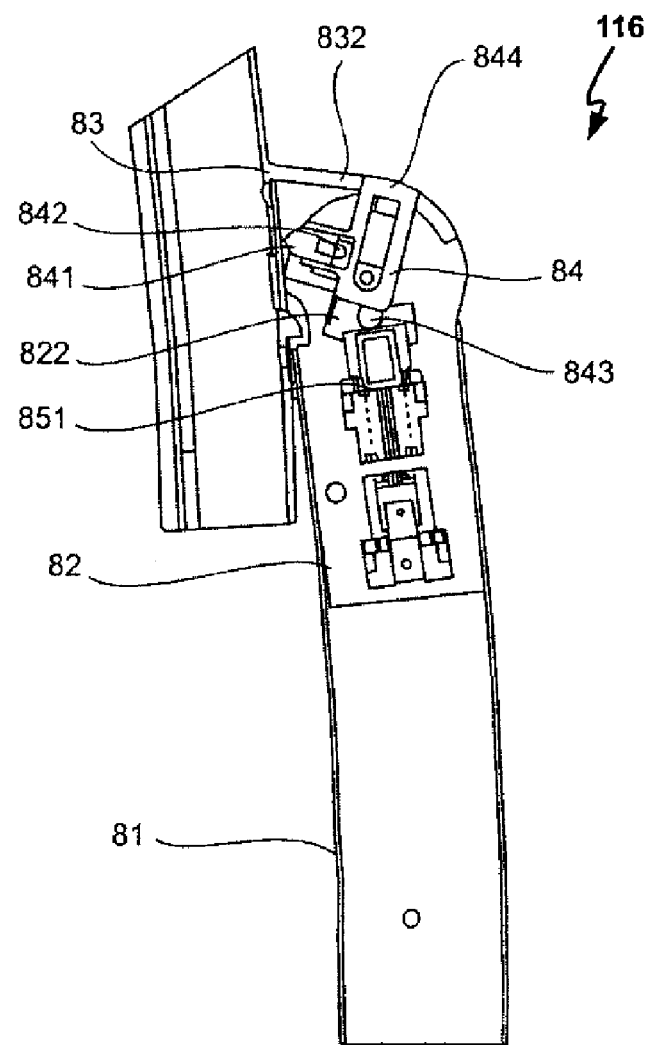

FIGS. 19-21 are views of locking mechanism 116 with the stroller 100 in the partly collapsed storage position, respectively from the side, from the front and in a cross-section. As shown in FIG. 21, the lock button 84 is, in this position of the stroller 100, in its position of partially protruding from the opening 822 defined in the lower element 82. Due to the rotation of the lower element 82 with respect to the upper element 83, the upper portion 844 is no longer hidden behind the wall 832, but instead abuts against the edge of this wall. In this position, the lock button 84 therefore locks the angular position of the lower element 82 with respect to the upper element 83, and therefore the rear strut with respect to the front strut of the stroller.

As shown in FIGS. 19 and 20, in partly collapsed storage position of the stroller 100, the mobile yoke 86 is in the same position in the groove 811 as when the stroller is unfolded use position. The rear cross-braces of the stroller are indeed in the same position.

Figures 24, 25:
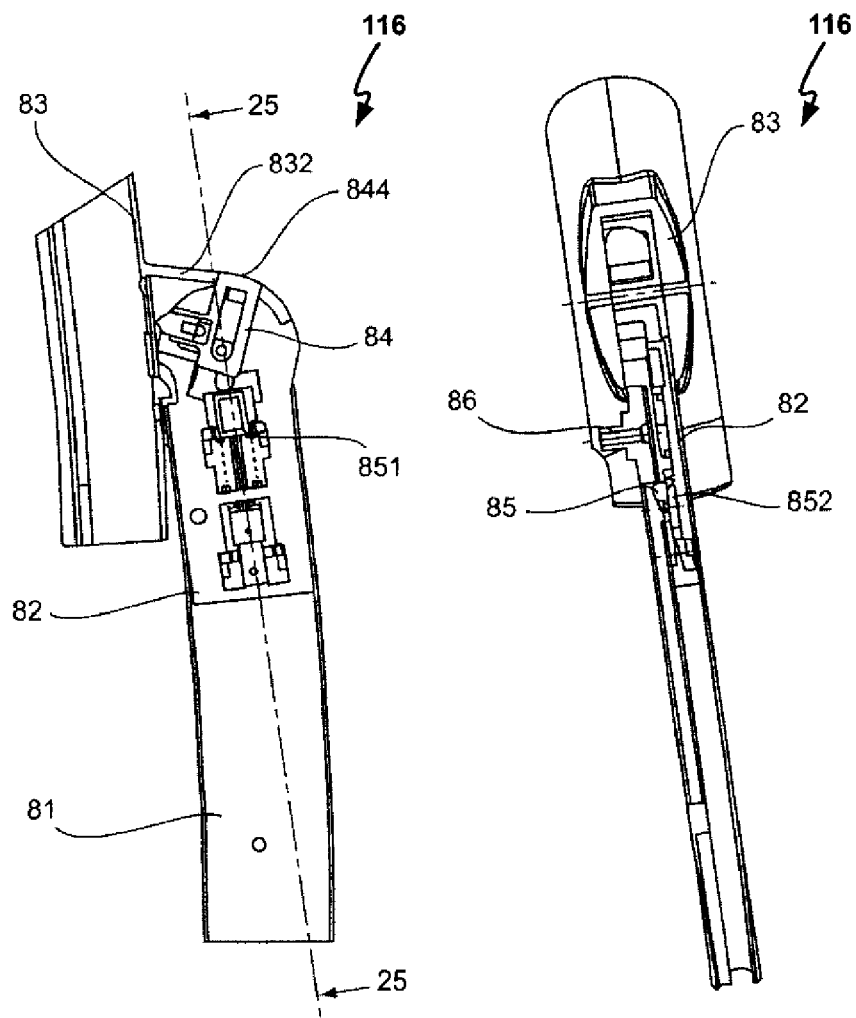

FIGS. 22-25 are views of locking mechanism 116 with the stroller in the fully collapsed storage position, respectively from the side, from the front and in two cross-sections. As shown in FIG. 24, the lock button 84 is, in this position of the stroller, in the same position as in the partly collapsed storage position. It therefore also locks the angular position of the rear strut with respect to the front strut of the stroller.

Figures 22, 23:
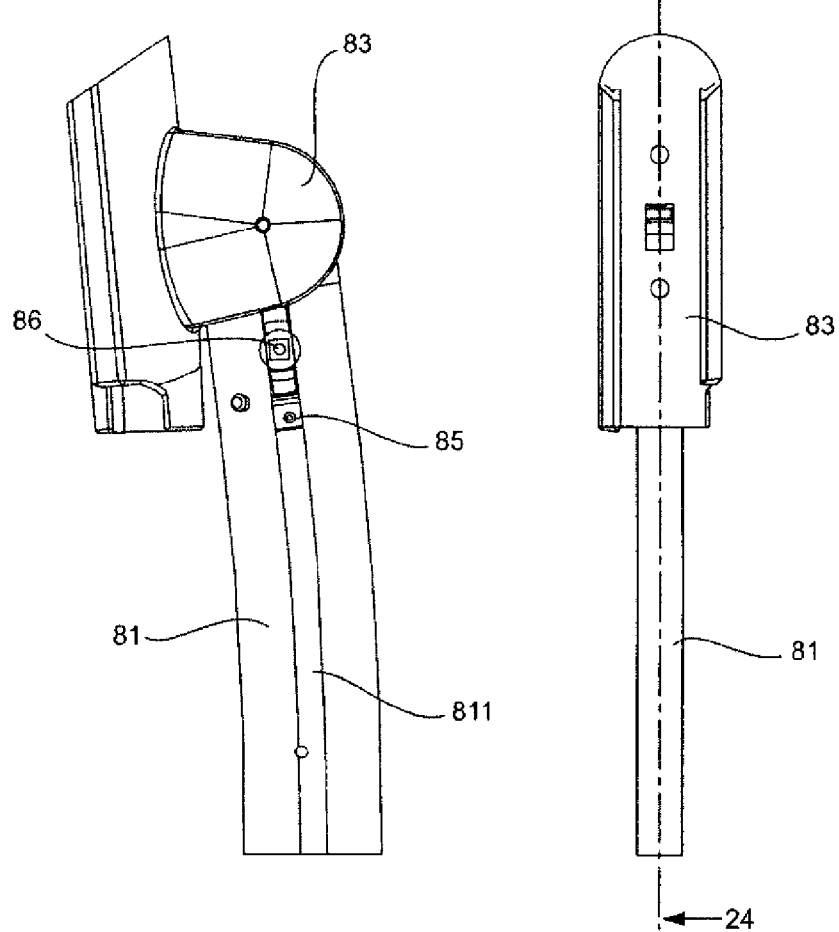

As shown in FIG. 22, in this fully collapsed storage position of stroller 100, the mobile yoke 86 is in a top position in the groove 811, near the upper end of the rear strut 81. This position of the mobile yoke corresponds to the folded position of the rear cross-braces of the stroller, in which the lateral assemblies are brought together.

As shown in FIGS. 22-25, the lock stop 85, pushed by the spring leaf 852, holds the mobile yoke 86 in this position, by locking the sliding thereof in the groove 811. The fully collapsed storage position of the stroller 100 is therefore locked by the locking mechanism.

The user can unlock any one of the folded positions by acting on the button formed by the upper portion 844 of the lock button 84, which appears next to the wall 832 of the upper element 83. By pressing on the lock button 84, the user pushes it into its position shown in FIGS. 26 and 27.

In this position, the upper portion 844 of the lock button 84 no longer abuts the wall 832 of the upper element 83. It therefore no longer locks the angular position of the lower element 82 with respect to the upper element 83.

In addition, in this position, the lower end 843 of the lock button 84 presses on the upper end of the unlocking unit 851, which then slides downward into its opening. The lower end of the unlocking unit 851 then acts on the lock stop 85 and retracts it into the lower element 82, thereby freeing the passage in the groove 811. If the mobile yoke 86 has been in its top position corresponding to the fully collapsed storage position, its position is then unlocked. The user's action on the upper portion 844 of the lock button 84 therefore enables the stroller folding position, whether fully collapsed or partly collapsed, to be unlocked.

Figures 26, 27:
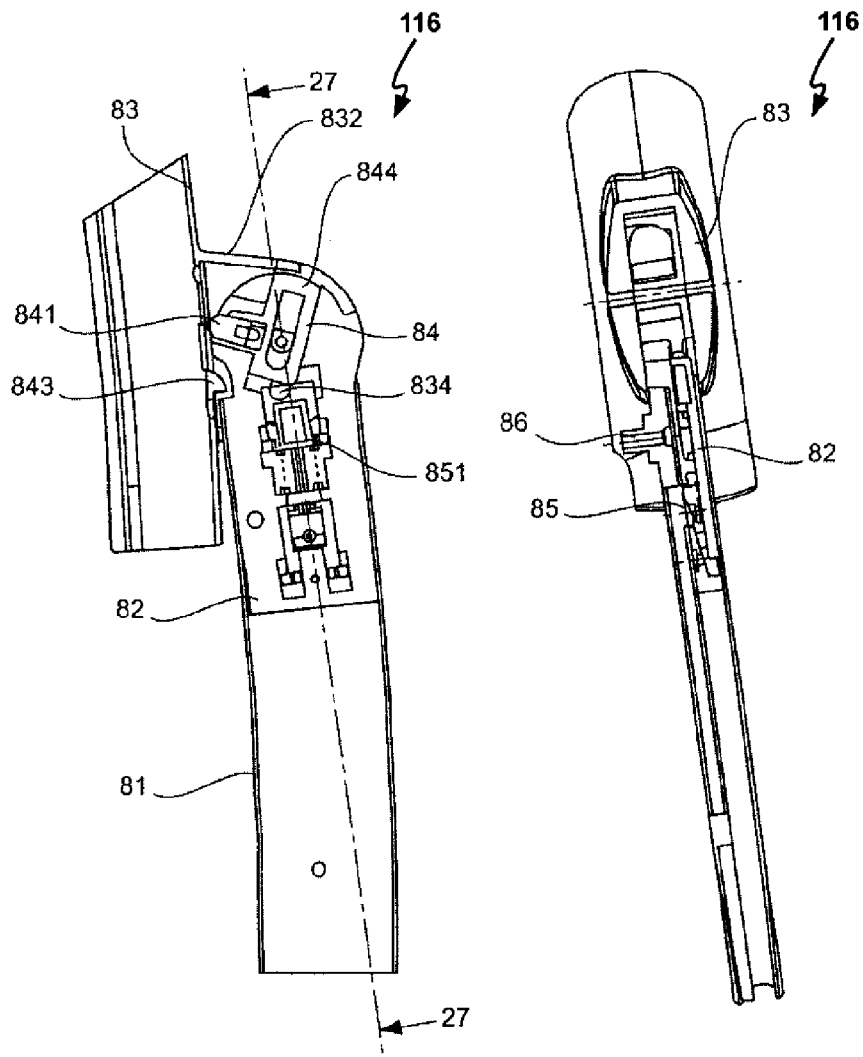
Figures 28, 29:
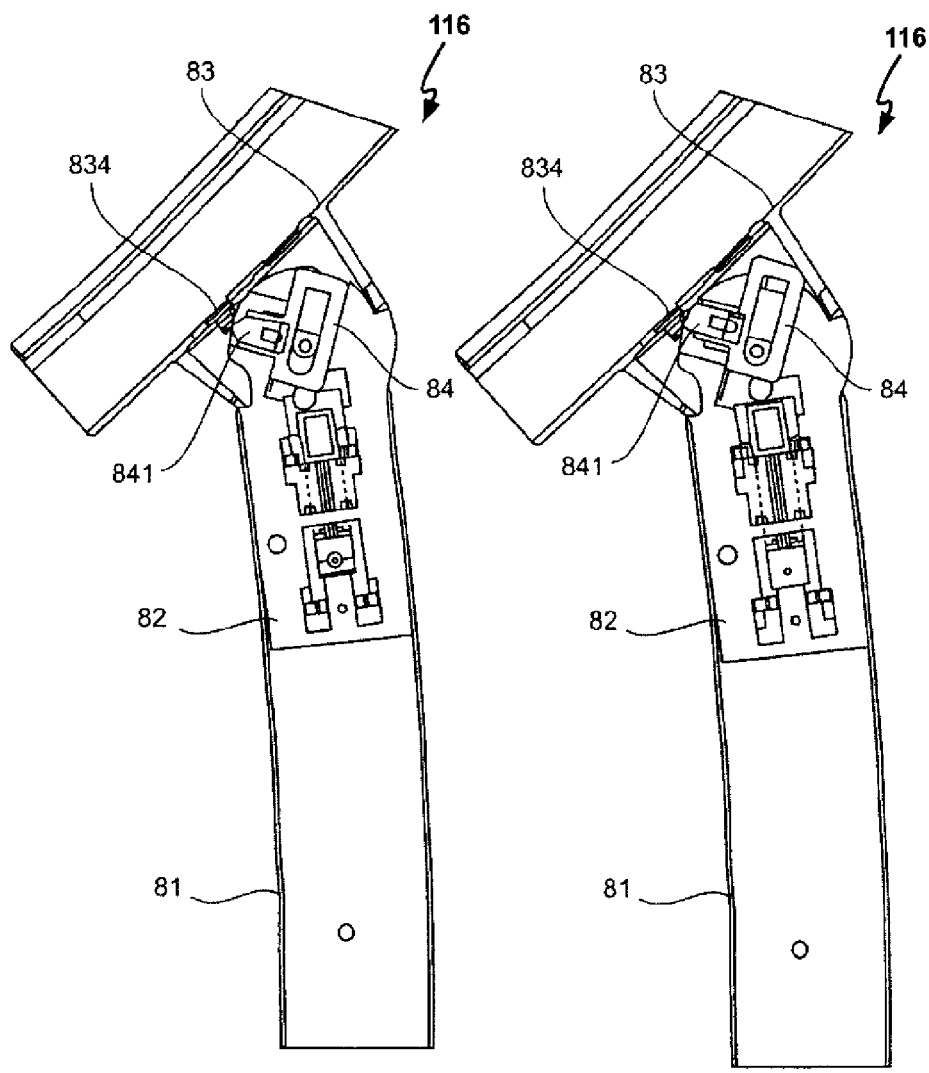

As shown in FIG. 26, when the lock button 84 is pressed, the memory unit 841 locks the lock button position 84, which thus remains in the pressed position. The unfolding of the stroller 100 is thus facilitated for the user. During the unfolding movement of the stroller 100, a stop 834 of the upper element 83 acts on the memory unit 841, as shown in FIGS. 28 and 29, so as to cause it to unlock the position of the lock stop 85.

Figure 30:
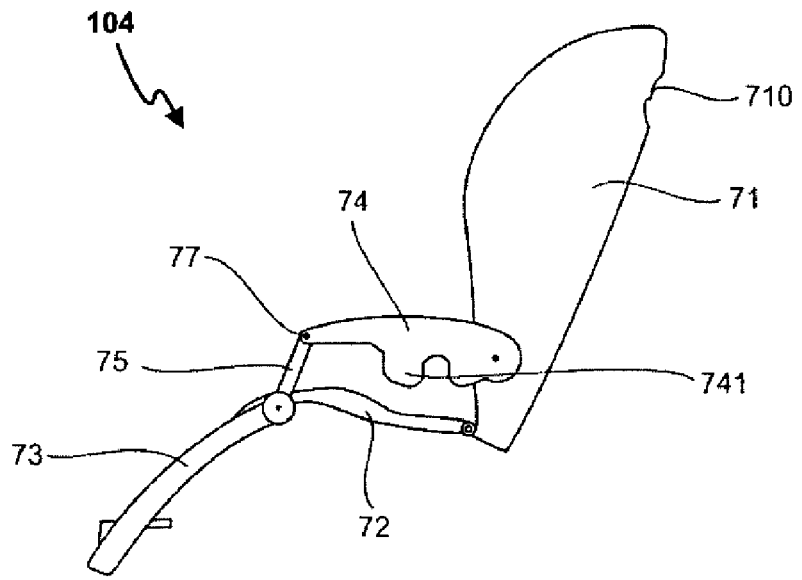
FIG. 30 is a partial right elevation view of a child carrier that may be used in used with the various frame movers presently disclosed and showing the child carrier is illustratively a hammock configured in a seated position.
Figure 31:
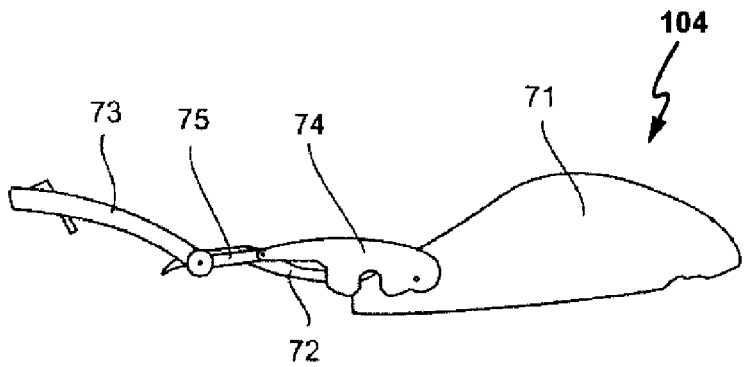
FIG. 31 is a view similar to FIG. 30 showing the hammock configured in a lying position.
Figure 32:
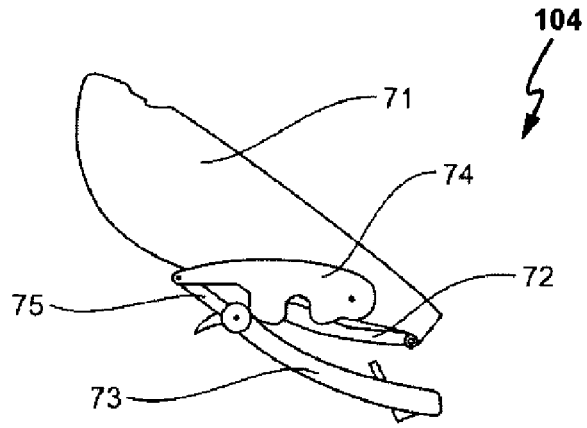
FIG. 32 is a view similar to FIG. 30 showing the hammock configured in a folded-storage position apart from a foldable stroller.

A child carrier 104, illustratively a hammock, is shown in FIGS. 30-34. The hammock is shown arranged in the seat position in FIG. 30. FIG. 31 shows the same hammock in a lying position, and FIG. 32 shows it in its storage position corresponding to the partly collapsed storage position of rolling chassis 102.

Figure 33:
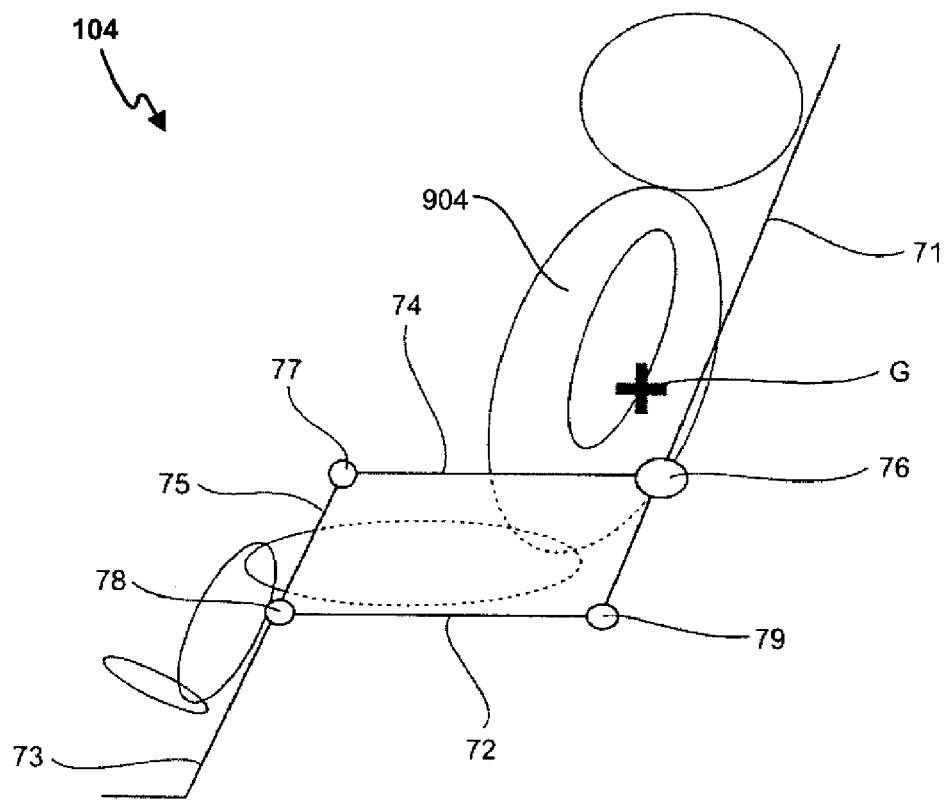
FIG. 33 is a diagrammatic view of the hammock of FIG. 30 showing the hammock in the seated position.
Figure 34:
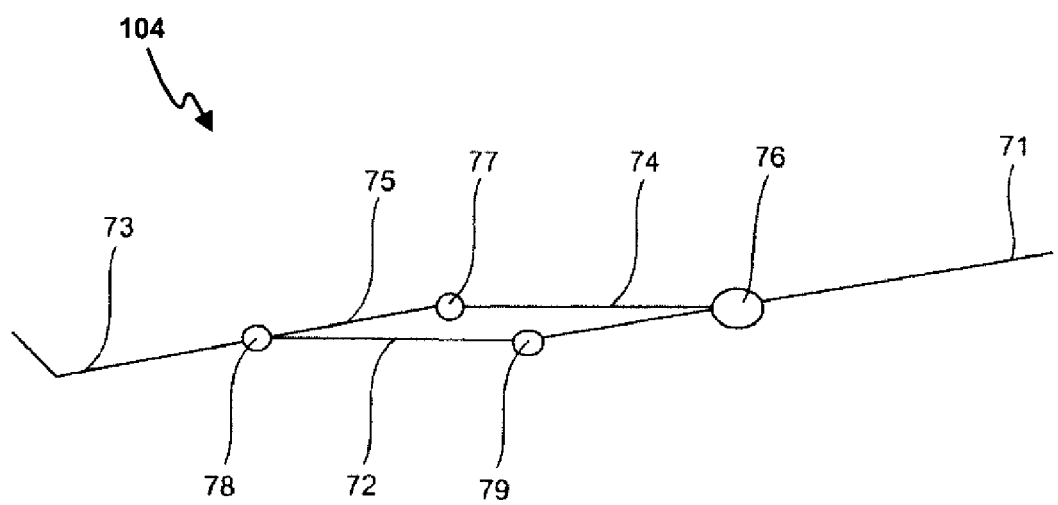
FIG. 34 is a diagrammatic view similar to FIG. 33 showing the hammock in the lying position.

This hammock is compact in the folded position, comfortable and easy to adjust in a plurality of positions. FIGS. 33 and 34 diagrammatically show the kinematics of this hammock, implementing a deformable parallelogram, respectively in the seated position (FIGS. 30 and 33) and in the lying position (FIGS. 31 and 34).

As shown in FIG. 30, the hammock includes a backrest 71 and a seat 72 as well as a footrest 73 in the extension of the seat 72. In this embodiment of the child carrier 104, the backrest 71 and the seat 72 are made, for example, of a plastic material and can be covered with any suitable coating.

Two armrests 74 extend from the backrest 71. They are connected, at their other end, to the seat, by means of a connecting rod 75. These armrests 74 form, or bear, the hammock support. They include securing means 741 capable of cooperating with complementary receiving means provided for this purpose on the chassis. Thus, the support comprises two armrests 74, to which, in the front portion, the connecting rod 75 is pivotably connected by means of the hinge 77, and in the rear portion, to which the backrest 71 is pivotably connected by means of the hinge 76.

The seat 72 is suspended at the front by a hinge 78 with the lower end of the connecting rod 75, and at the rear by a hinge 79 with the bottom of the backrest 71. This assembly is repeated on each of the two sides of the hammock. The footrest 73 is pivotably connected to the front of the seat, for example, by the hinge 78. Its direction can be synchronized with the movement of the connecting rod 75. If necessary, a disengaging clutch system, for example, can be provided in order to deactivate this synchronization according to the user's needs.

The hinges 76 include locking means for various inclination positions, including at least two positions: the seated position of FIG. 30 and the lying position of FIG. 31. Intermediate positions can of course be envisaged. It is not necessary to provide a lock for the folded storage position of FIG. 32.

The unlocking control can be centralized on the top of the backrest, and represented by the handle 710. The connection between the handle 710 and the locking nuts (not shown) formed at the level of the hinges 76 can, for example, be provided by cables.

As shown more clearly in the diagrammatic drawings of FIGS. 33 and 34, the four hinges 76, 77, 78, and 79 form a deformable parallelogram. This kinematic arrangement allows: two-dimensional flat folding, as shown in FIG. 32, with the backrest 71 folded over the seat 72; the possibility of obtaining a lying position, with an angle formed between the seat and the backrest capable of being greater than 170 degrees, while preserving the synchronization of the footrest 73; and a seat 72 maintained in all of the positions.

In addition, the fact that the locking of the inclination is ensured in the locking nut at the level of the hinge 76 between the armrest 74 and the backrest 71 enables the manipulations to be facilitated. Indeed, the hinge is used much less than if the locking nut were placed, as is the case in most hammocks with an inclinable backrest, at the bottom of the backrest 71.

The position of the axis of this hinge 76 is located in the vicinity of the child's centre of gravity G (FIG. 33), thereby enabling the load to be balanced in the hammock, and allowing for much easier positioning maneuvers. This approach makes it easier to raise the backrest 71 from the lying position to the seated position, even in the presence of a child, and secures the positioning, in the event of a movement toward the lying position, preventing the risk of the backrest suddenly falling back under the child's weight.

Illustratively, a stroller may be substantially symmetrical, and the frame of the stroller includes two lateral assemblies generally each comprising a front wheel support (or front strut) bearing a front wheel, a rear wheel support (or rear strut) bearing a rear wheel, and a pushing element (or push arm). These lateral elements are located respectively in two planes substantially parallel to one another and parallel to the plane of symmetry of the stroller, and are connected to one another by other elements of the stroller.

It should be noted that the term wheel is used herein to designate, a single wheel of the stroller or a set of two twin wheels. In general, stroller designers are trying to propose strollers with minimized bulk, in the folded position, and with simple and intuitive folding and unfolding. Among the various types of folding, two type of collapsing folds are disclosed herein: a fully collapsed storage position and a partly collapsed storage position.

In a partly collapsed storage position, the push arms, the front struts and the rear struts of the stroller are brought substantially into the plane defined by the wheels. The positions of the right-hand and left-hand lateral assemblies, one with respect to the other, i.e. the spacing between the two lateral assemblies, do not change between the folded position and the unfolded position of the stroller. However, the volume of the folded stroller remains relatively large.

In a fully collapsed storage position, means for modifying the spacing is provided in order to bring the lateral assemblies together, so as to obtain a compact folded assembly. This folding is generally accomplished by means of cross-braces connecting the right-hand and left-hand lateral assemblies. A cross-brace is an assembly of at least two rods capable of pivoting with respect to one another so as to adopt a plurality of positions. These rods can, for example, form a pivoted X, a deformable parallelogram assembly, or a compass arrangement.

A desire of the present disclosure is to provide a stroller, and a stroller chassis, in which the folding is chosen according to the needs and expectations of the user. Thus, in particular, a desire is to provide such a stroller in which the bulk can be minimized significantly. Another desire is to provide such a stroller that is simple and inexpensive to produce. The subject of the present disclosure is also intended to provide such a stroller, in which the manipulations for folding and unfolding are simple and intuitive.

The invention claimed is:
1. A foldable stroller comprises
a child carrier adapted to support a child sitting therein,
a rolling chassis coupled to the child carrier, the rolling chassis including a collapsible left frame and a collapsible right frame coupled to and positioned to lie in spaced-apart relation to the collapsible left frame and each collapsible frame includes a front strut, a rear strut, and a push arm coupled to the front strut to move slide into a position alongside and parallel to the front strut, and
frame mover means for moving the collapsible left frame and the collapsible right frame between an unfolded use position wherein the collapsible left frame and the collapsible right frame are positioned to lie in spaced-apart relation to each other, the push arm is arranged to extend substantially away from the front strut, and the rear strut is positioned to lie in spaced-apart relation to the front strut, a fully collapsed storage position wherein the collapsible left frame and the collapsible right frame are positioned to lie in confronting relation to each other, the push arm is arranged to lie in substantially confronting relation with the front strut, and the rear strut is arranged to lie in substantially confronting relation with the front strut, and a partly collapsed storage position wherein the collapsible left frame and the collapsible right frame are positioned to lie in spaced-apart relation to each other, the push arm is arranged to lie in substantially confronting relation to the front strut, and the rear strut is moved toward and arranged to lie closer to the front strut.

2. A foldable chassis for a juvenile stroller comprising a collapsible left frame including a left front strut, a left rear strut coupled to the left front strut to pivot about a left pivot axis relative to the left front strut, and a left push arm coupled to the left front strut to slide back and forth between an extended use position and a retracted storage position, a collapsible right frame including a right front strut, a right rear strut coupled to the right front strut to pivot about a right pivot axis relative to the right front strut, and a right push arm coupled to the right front strut to slide back-and-forth between the extended use position and the retracted storage position, and a folding mechanism configured to provide means for moving the foldable chassis between an unfolded use position wherein the collapsible left frame is positioned to lie in spaced-apart relation to the collapsible right frame and the left push arm and the right push arm are in the extended use position, a partly collapsed storage position wherein the collapsible left frame and the collapsible right frame are positioned to lie in spaced-apart relation to each other and the left push arm and right push arm are configured to slide into the retracted storage position, and a fully collapsed storage position wherein the collapsible left frame and the collapsible right frame have moved toward each other and the left push arm and the right push arm are configured to slide into the retracted storage position.

3. A stroller chassis for a child stroller comprising two lateral assemblies, each comprising at least a front strut and a rear strut, and means for controlling a spacing between the lateral assemblies, enabling them to be brought together in a fully collapsed storage position and spaced-apart from one another in an unfolded position, characterized in that the means for controlling the spacing includes means for selective coupling of the means for controlling the spacing with the lateral assemblies capable of adopting an active state and an inactive state, so as to enable two types of folding of the stroller chassis, the fully collapsed storage position, in which the lateral assemblies are simultaneously folded, each rear strut being moved toward the front strut, the lateral assemblies being brought together by the means for controlling the spacing, in the active state, and a partly collapsed storage position, in which each lateral assembly is folded, the rear strut being moved toward the front strut, the two lateral assemblies being kept apart from one another, and the means for selective coupling is configured so as not to cause movement of the means for controlling the spacing between the lateral assemblies in the inactive state.

4. The stroller chassis according to claim 3, characterized in that the means for selective coupling are in the active state when the folding is performed by acting on the means for controlling the spacing, and in the inactive state when the folding is performed by acting on the lateral assemblies.

5. The stroller chassis according to claim 4, characterized in that the means for selective coupling includes a flexible connection, in the active state when the flexible connection is pulled and in the inactive state when the flexible connection is compressed.

6. The stroller chassis according to claim 5, characterized in that the flexible connection belongs to a group including a strap, a cable, and a pivoting connecting rods assembly.

7. The stroller chassis according to claim 5, characterized in that upper ends of the means for controlling the spacing include a guide part sliding over the rear strut, connected by the flexible connection to a connecting rod connecting the front strut and the rear strut of each lateral assembly.

8. The stroller chassis according to claim 3, characterized in that the means for controlling the spacing includes an assembly of at least two rods forming at least one cross-brace connecting the lateral assemblies.

9. The stroller chassis according to claim 8, characterized in that the at least one cross-brace connects the rear struts of the lateral assemblies.

10. The stroller chassis according to claim 3, characterized in that the means for selective coupling includes at least one sliding connection of a connection part in a groove, in which the means for selective coupling are in the active state when the connection part abuts against an end of the groove, and in the inactive state when the connection part can slide in the groove.

11. The stroller chassis according to claim 10, characterized in that the groove is formed in an element of one of the lateral assemblies, and in that the connection part is mounted at the end of a rod of a cross-brace forming the means for controlling the spacing.

12. The stroller chassis according to claim 3, further comprising a mechanism for locking a folded position of the stroller chassis, the mechanism including first means for locking one of the lateral assemblies in the folded position, second means for locking the means for controlling the spacing in the folded position, and unlocking means for ensuring the simultaneous unlocking of the first and second locking means.

13. The stroller chassis according to claim 3, further comprising means for supporting and holding at least one child carrier between the two lateral assemblies.

14. The stroller chassis according to claim 13, characterized in that the removable child carrier belongs to a group including a foldable hammock, a non-foldable hammock, and a baby seat.

15. The foldable stroller of claim 1, wherein the frame mover means comprises a linkage and a linkage actuator, the linkage actuator is coupled to and arranged to extend between the collapsible left frame and the collapsible right frame to cause the collapsible left frame and the collapsible right frame to assume the fully collapsed storage position in response to application of an upward force to the linkage actuator.

16. The foldable stroller of claim 15, wherein the linkage includes a lateral connecting rod and a connector, the linkage is coupled to the push arm at a first end, coupled to the connector at an opposite second end, and to the rear strut between the first and the second ends, and the connector is arranged to interconnect and extend between the rear strut and the opposite second end of the lateral connecting rod.

17. The foldable stroller of claim 16, wherein the connector transfers force applied to the connector when the force is a tensile force and the connector does not transfer force applied to the connector when the force is a compressive force.

18. The foldable stroller of claim 15, wherein the linkage includes a left lateral connecting rod arranged to extend between and interconnect the push arm and the rear strut of the collapsible left frame, a right lateral connecting rod arranged to extend between and interconnect the push arm and the rear strut of the collapsible right frame, a first cross member arranged to extend between and interconnect the left lateral connecting rod to the rear strut of the collapsible right frame, and a second cross member arranged to extend between and interconnect the right lateral connecting rod to the rear strut of the collapsible left frame.

19. The foldable stroller of claim 18, wherein the right lateral connecting rod includes a first end, an opposite second end, and a ball joint, the opposite second end is formed to include a groove in which the ball joint is positioned to lie and configured to move back forth in the groove, the right lateral connecting rod is coupled to the rear strut of the collapsible right frame at the first end, the right lateral connecting rod is coupled to the push arm of the collapsible right frame at the opposite second end, and second cross member is coupled to the right lateral connecting rod by the ball joint.

* * * * *